Pascal Spurlino
Mayo A. Goodbar
and Marvin D. Frost
Inventors

By Earl Beust
Their Attorney

April 4, 1944.　　　P. SPURLINO ET AL　　　2,345,839
ACCOUNTING MACHINE
Filed March 6, 1941　　　8 Sheets-Sheet 2

Pascal Spurlino
Mayo A. Goodbar
and Marvin D. Frost
Inventors

By Earl Beust
Their Attorney

April 4, 1944.　　　P. SPURLINO ET AL　　　2,345,839
ACCOUNTING MACHINE
Filed March 6, 1941　　　8 Sheets-Sheet 3
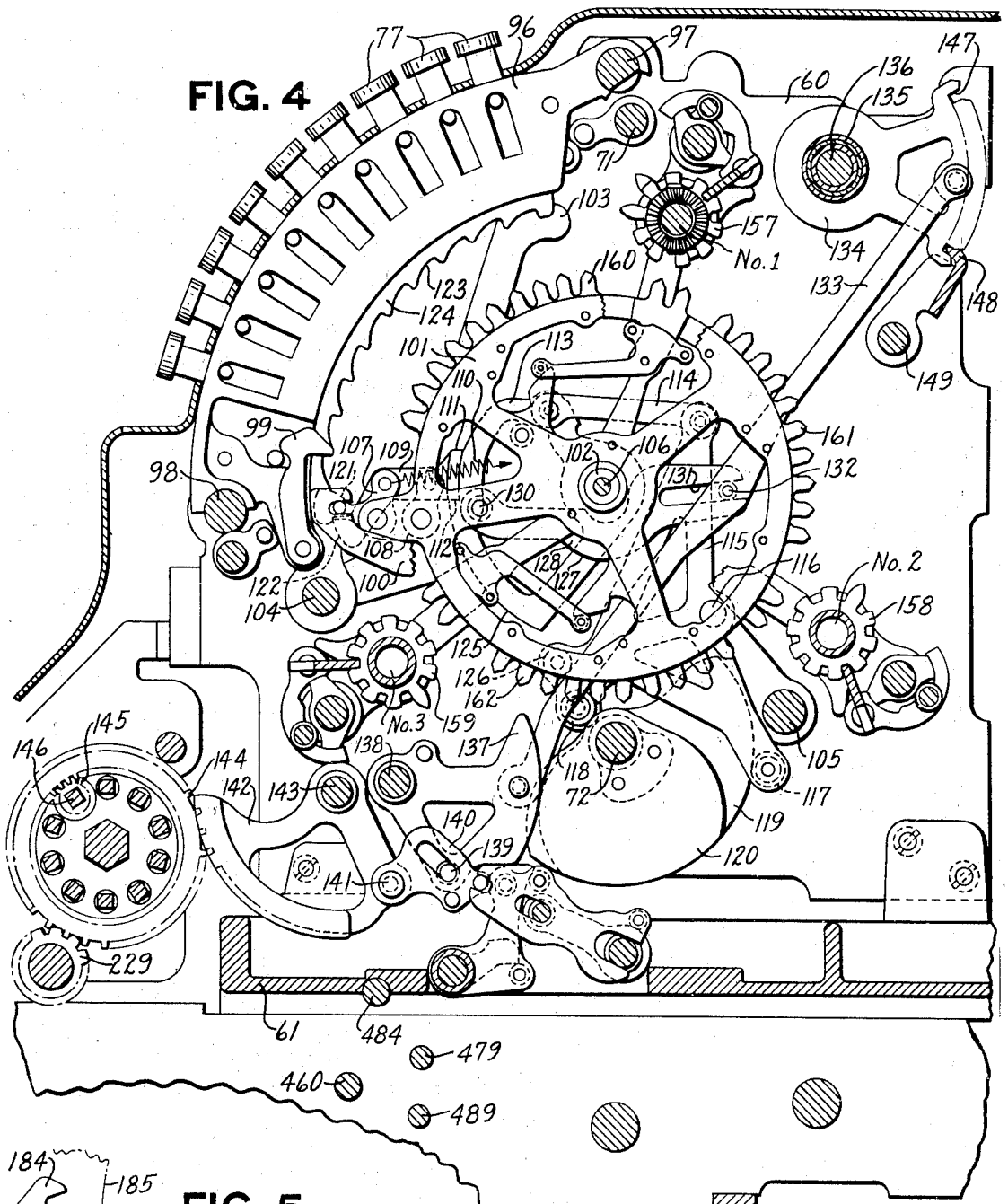
Pascal Spurlino
Mayo A. Goodbar
and Marvin D. Frost
Inventors
By Carl Benst
Their Attorney April 4, 1944.   P. SPURLINO ET AL   2,345,839
ACCOUNTING MACHINE
Filed March 6, 1941   8 Sheets-Sheet 4

Pascal Spurlino
Mayo A. Goodbar
and Marvin D. Frost
Inventors

By Earl Beust
Their Attorney

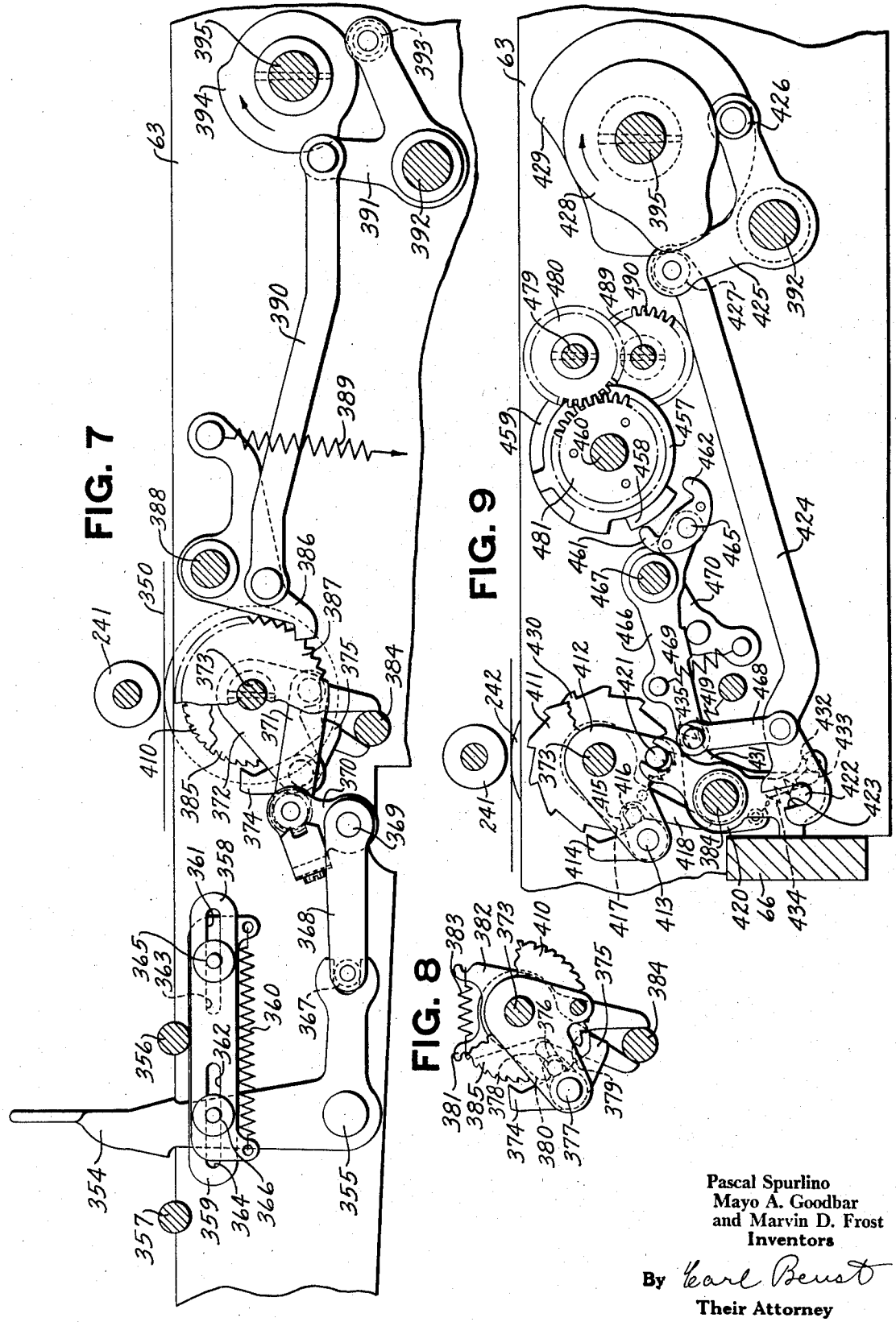

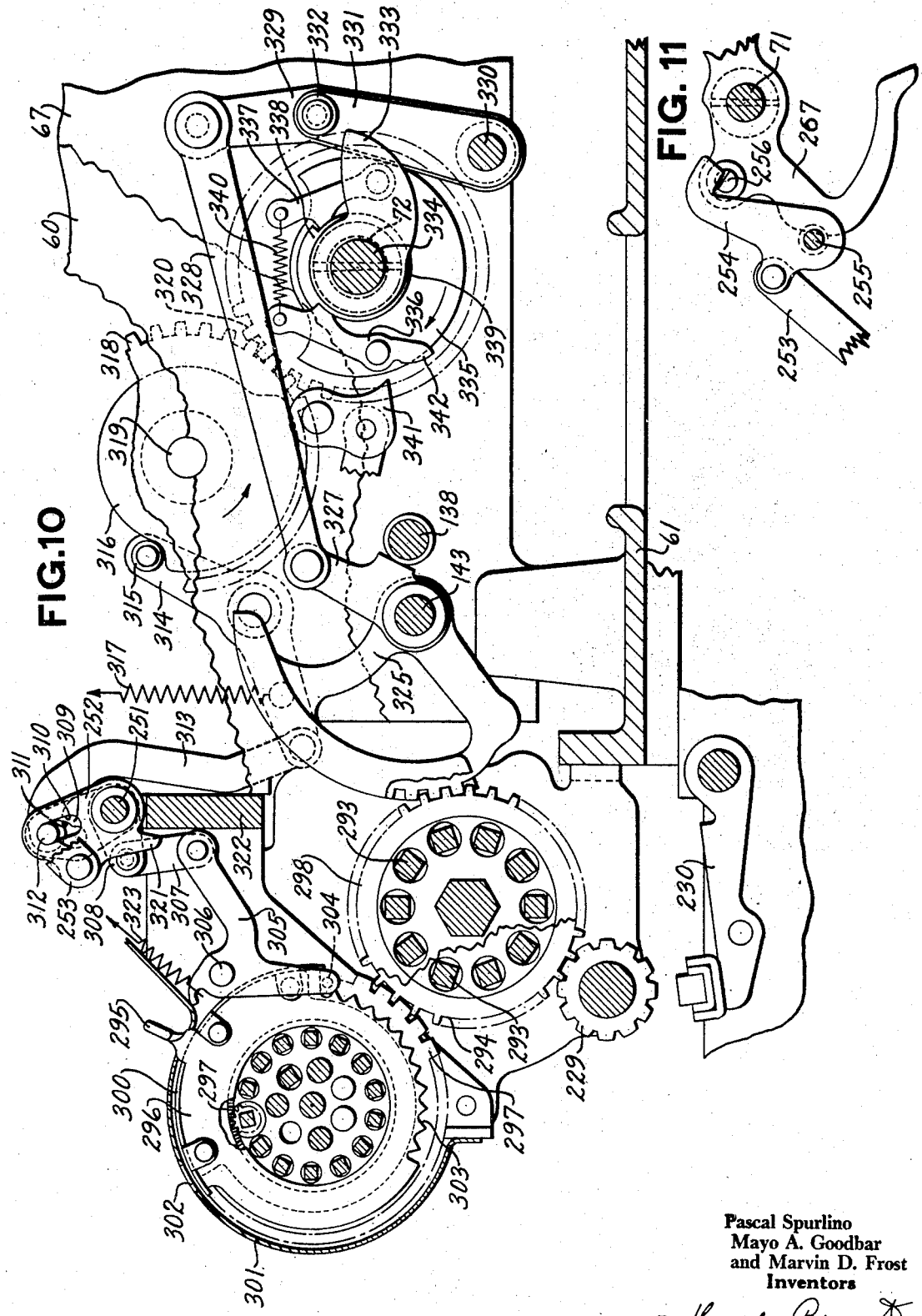

April 4, 1944.　　P. SPURLINO ET AL　　2,345,839
ACCOUNTING MACHINE
Filed March 6, 1941　　8 Sheets-Sheet 7
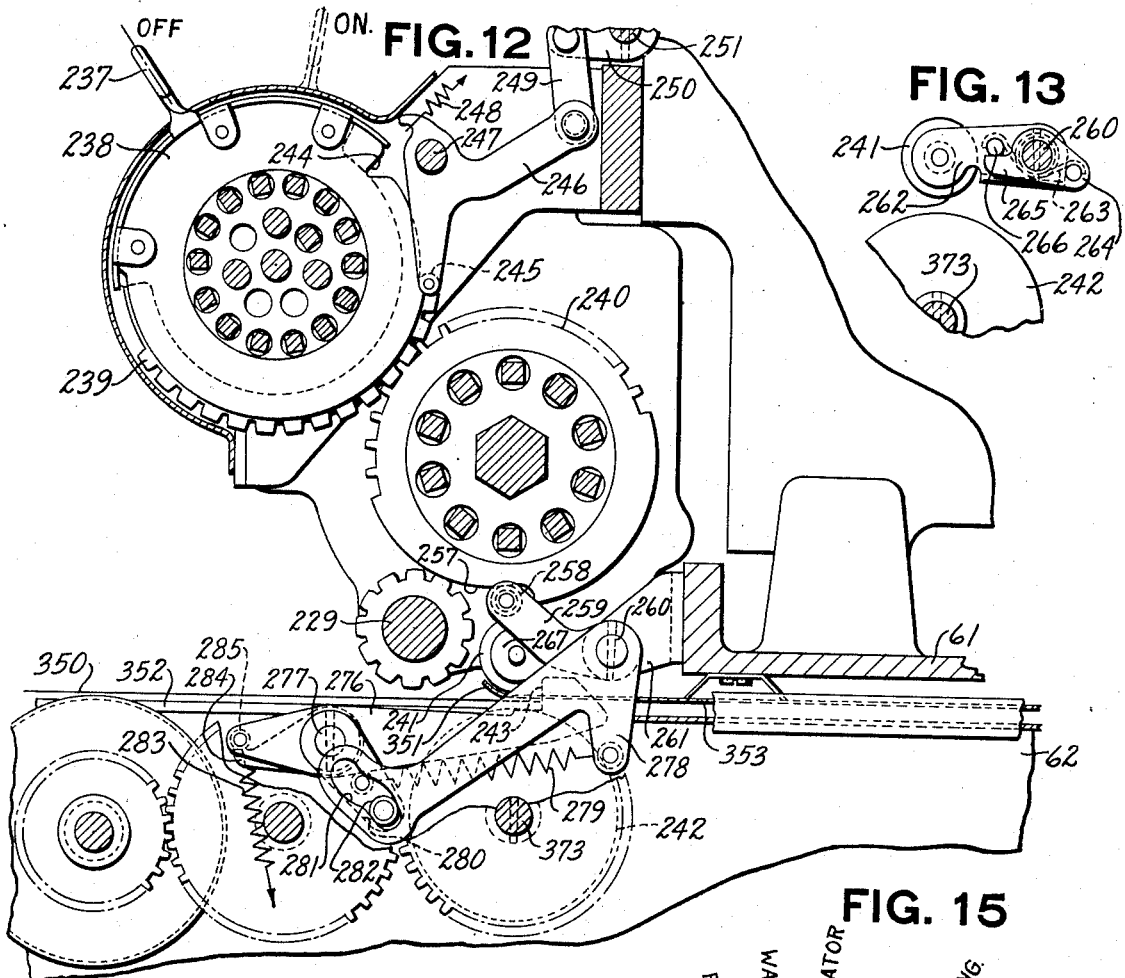
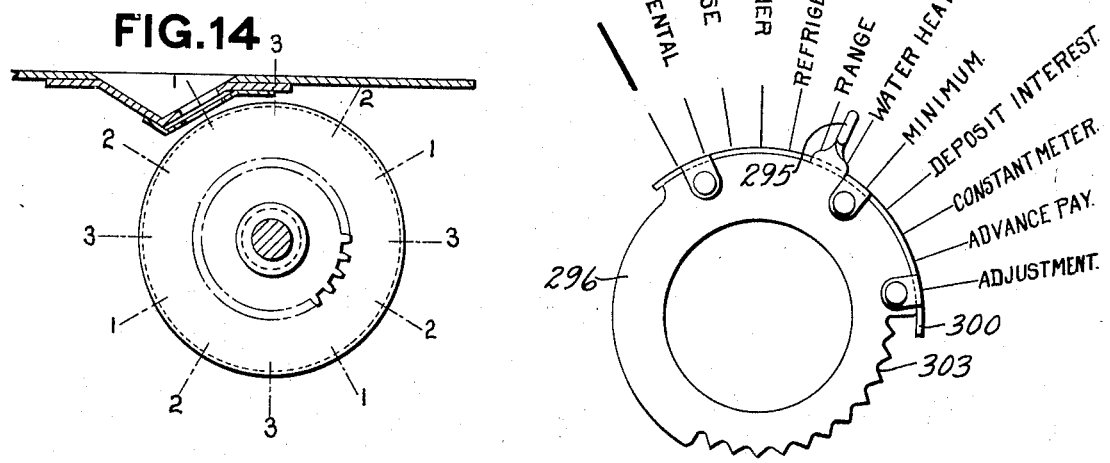
Pascal Spurlino
Mayo A. Goodbar
and Marvin D. Frost
Inventors
By *Earl Benst*
Their Attorney

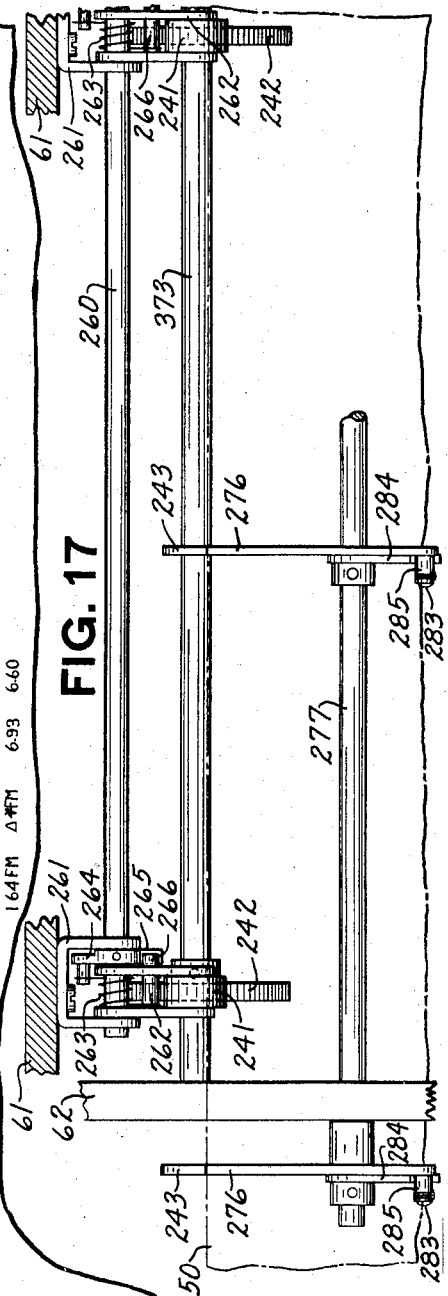

Patented Apr. 4, 1944

2,345,839

UNITED STATES PATENT OFFICE 2,345,839

ACCOUNTING MACHINE

Pascal Spurlino, Mayo A. Goodbar, and Marvin D. Frost, Dayton, Ohio, assignors to The National Cash Register Company, Dayton, Ohio, a corporation of Maryland Application March 6, 1941, Serial No. 381,962

7 Claims. (Cl. 197—127)

This invention relates to accounting machines and similar business machines and is directed particularly to the record material feeding and printing mechanisms thereof.

The invention is herein shown embodied in a machine of the general type shown in the following United States Letters Patent, and reference may be had to them for a complete showing and description of standard mechanisms not fully disclosed herein: Patents No. 1,693,279, issued November 27, 1928, to Walter J. Kreider; Nos. 1,619,796 and 1,916,535, issued March 1, 1927, and July 4, 1933, respectively, to Bernis M. Shipley; No. 2,141,332, issued December 27, 1938, to Charles H. Arnold; and No. 2,175,346, issued October 10, 1939, to Maximilian M. Goldberg; and the copending application for Letters Patent, Serial No. 359,374, filed October 2, 1940, by Pascal Spurlino and Konrad Rauch, for Accounting machines.

The machine illustrated herein as embodying the present invention is well adapted for use by public utility companies and especially in the bookkeeping departments thereof, where the various items involved in each customer's account for certain specified periods of time are listed, classified, and totaled on a ledger sheet or any other suitable record material.

In the system to which the present invention is shown applied, the ledger sheet is not only divided vertically into a plurality of classification columns, but is also divided horizontally into a plurality of customer account spaces, each of such spaces being the equivalent of three printing lines.

When a customer's account is printed, the three printing lines contained in the customer's account space are utilized to whatever extent the number of items chargeable to that particular account may require, and the total, both gross and net, of all of such items is printed in the extreme right-hand column of the ledger sheet. Whenever a total of a customer's account is printed, the ledger sheet is automatically fed to bring the first printing line of the next customer account space into position to be printed upon.

Manually operable feeding means is provided for feeding the ledger sheet in either one of two different directions in order to print, without regard to any particular order, on the different printing lines of a customer's account space.

Inasmuch as the number of lines printed upon in any one customer's account space may vary from one to three, or, after printing on all three lines, another item may again be printed on the first line, the extent of the automatic feeding movement of the ledger sheet to the next succeeding customer's account space will vary according to the printing line upon which the last printing occurred in the preceding space.

An indicator is provided for displaying to the operator at all times the particular printing line of a customer's account space on which the machine is adjusted to print.

Manually operable means is provided for differentially adjusting symbol-printing type wheels, which means and type wheels are automatically restored to their home positions near the end of the operation of the machine.

For the purpose of illustrating one form of the present invention, the machine shown herein is constructed to perform the functions stated above. However, it is not intended to limit the invention to this one form, as other forms for fulfilling the requirements of other business systems may be used without in any way departing from the invention.

It is, therefore, an object of this invention to provide an accounting machine with a more flexible type of record material feeding mechanism.

Another object is to provide a record material feeding mechanism, operable either manually or automatically, for imparting a variable number of different feeding movements to the record material.

A further object is the provision of record material feeding mechanism which is manually operable to feed the record material in different directions and automatically operable to feed the record material variable distances, depending upon the position to which the record material was last fed manually.

Another object is to provide a record material feeding mechanism which is manually operable during one kind of operation of the machine to feed the record material variable distances in one or the other of two different directions and is automatically operable during another kind of operation of the machine to feed the record material variable distances, depending upon the position to which the record material was last fed manually.

A still further object is to provide feeding mechanism operable automatically to provide one type of feed for record material or manually for feeding in one or the other of two different directions record material having thereon a plurality of spaces, each space being equal to a plurality of printing lines, to bring any one of the printing lines of any of such spaces into position to be printed upon.

Another object is to provide feeding mechanism operable either manually or automatically, such manual operation being for feeding record material having a plurality of spaces thereon, each space being equal to a plurality of printing lines, to bring any printing line of any one of such spaces into position to be printed upon, while such automatic operation is for feeding the record material to bring a printing line of another one of said spaces into position to be printed upon.

Another object is to provide means for visibly indicating at all times which one of the printing lines of any of the spaces on the record material is in position to be printed upon.

Another object is to provide a printing element differentially adjustable by a manipulative device, both said element and said device being automatically restored to their home positions near the end of each operation of the machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 4 is a sectional view of the machine, taken to the right of one of the banks of amount keys, looking toward the left-hand end of the machine.

Fig. 5 is a detail view showing the first transaction bank zero stop pawl and its controlling means.

Fig. 7 is a detail side elevation of the manual means for operating the feeding mechanism.

Fig. 8 is a detail side view of a portion of the manual means for operating the feeding mechanism to feed the record material in either one of two different directions.

Fig. 9 is a side elevation of the automatic means for operating the feeding mechanism.

Fig. 10 is a side elevation of the symbol-printing type wheels, the manipulative device for differentially adjusting the same, and the means for automatically returning both said wheels and said device to their home positions.

Fig. 11 is a detailed fragmentary view of an interlock associated with the machine release.

Fig. 12 is a side elevation of the manual means for rendering the feeding mechanism operable and releasing the machine for operation.

Fig. 13 is a detailed side view of one of the pressure rollers associated with the feed rollers.

Fig. 14 is a detailed side view of the means for indicating the lines on the record material which have been fed to printing position.

Fig. 15 is a detailed side view of the manipulative device for differentially adjusting the type wheels associated therewith, showing its various positions of adjustment.

Fig. 16 is a facsimile of a portion of a ledger sheet printed in the machine.

Fig. 17 is a top plan view of the feed rollers, the pressure rollers cooperating therewith, and the record material guide stop.

GENERAL DESCRIPTION

Figure 1:
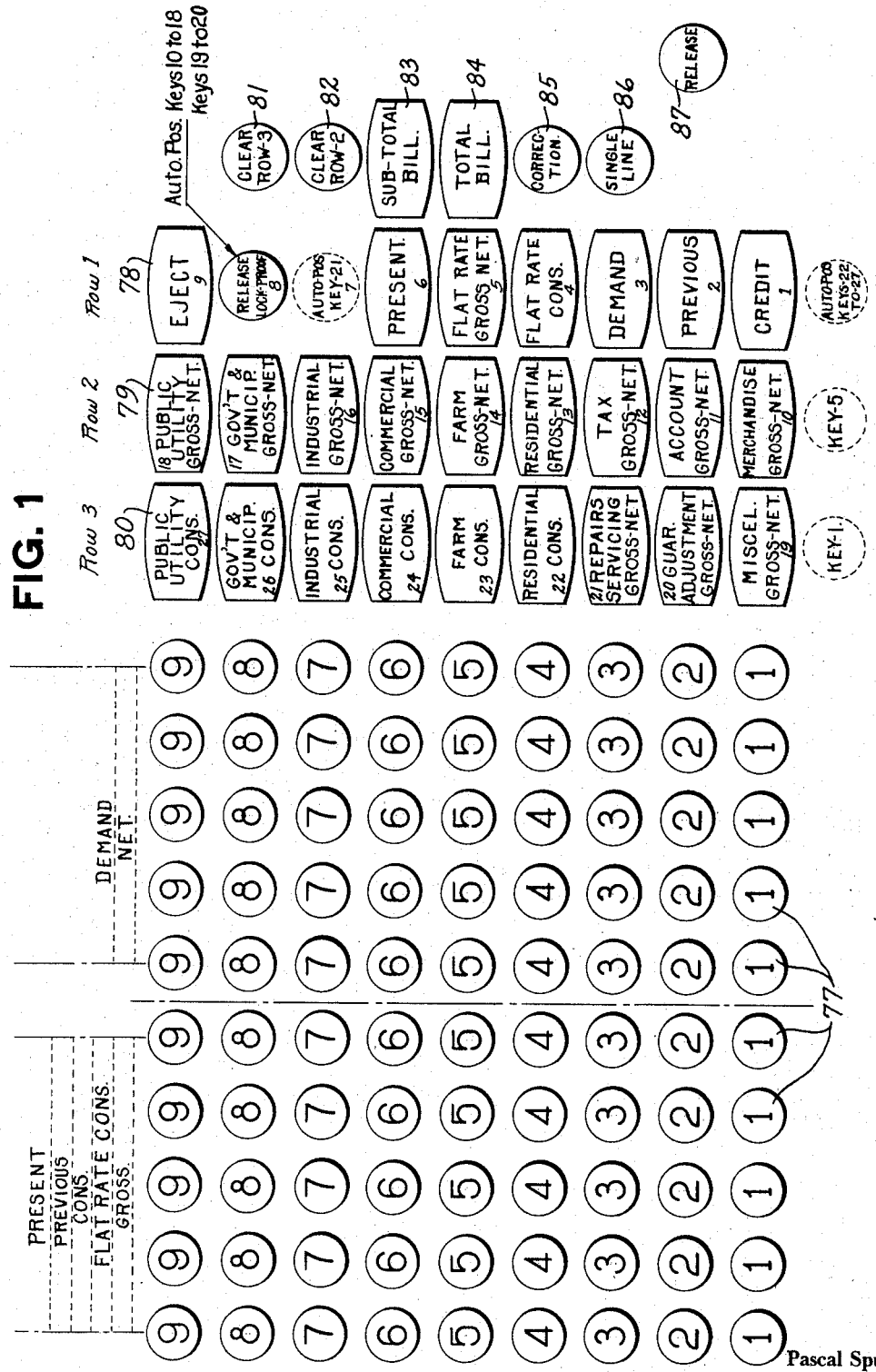
Fig. 1 is a diagrammatic view of the keyboard of the machine.

Described in general terms, the machine embodying the present invention is of the same general type as that disclosed in the Shipley and Arnold patents heretofore referred to. Like the machines disclosed in such patents, the present machine is provided with a plurality of totalizers and column-printing mechanism. The totalizers are operated by differential mechanism under the control of amount keys, while the selection of the totalizers to be operated is accomplished through differential mechanism under control of control keys provided for that purpose.

The above-mentioned differential mechanisms also serve to adjust the printing mechanism to print various amounts and data relating thereto on record material.

The present invention, however, concerns itself chiefly with providing both manual and automatic means for feeding the record material in a manner to facilitate printing on various portions of the record material in any desirable order. For illustrative purposes, the machine embodying the present invention has been shown applicable to a system commonly employed by public utility companies or other similar types of businesses wherein the various kinds of items involved in each customer's account for certain definite periods of time and the totals thereof are listed and classified on a ledger sheet or other suitable record material.

The ledger sheet used in this particular instance is not only divided vertically into a plurality of classification columns, but is also divided horizontally into a plurality of customer account spaces, each of such spaces containing three printing lines, each line extending through all of the classification columns.

When a customer's account is printed, the manual means provided for operating the record material feeding mechanism enables the operator to feed the record material in either one of two different directions to print upon any desirable one of the printing lines of a customer-account space. After all of the items relating to a customer's account have been printed, the record material is, immediately after the total for the account is printed, automatically fed to bring the first printing line of the next customer's account space into printing position.

The present machine is provided with internal-external gear driving mechanism, such as that disclosed in the above-mentioned Kreider patent, which is for the purpose of simultaneously setting up, on groups of printing devices, amounts and data under control of the keys, so that printing can be readily performed on different portions of the ledger sheet.

The above-mentioned column-printing mechanism is controlled by the usual type of differential mechanism fully shown in the Shipley and Arnold patents previously mentioned and is also shown generally in this application.

To aid the operator in manually feeding the ledger sheet or other suitable record material to print on the properly desired printing line of a customer's account space, there is provided in the machine an indicator wheel which is arranged to rotate with the feeding rollers and thus always indicate the exact printing line of the selected space on the ledger sheet which is in position to be printed upon.

There is also provided in the machine manual means for differentially adjusting symbol-printing wheels for printing certain identifying data in connection with the amounts. Such manual adjusting means and printing wheels are automatically restored to their home positions near the end of the operation of the machine.

The machine keyboard is arranged for taking care of the requirements of the type of system mentioned, whereby all the items, together with the data relating thereto, for each customer's account are periodically printed on a ledger sheet provided for that purpose. The machine is, therefore, provided with the usual banks of amount keys, the banks of amount keys being divided into two separate groups (commonly referred to as a "split keyboard") for the purpose of setting up simultaneously two separate amounts thereon.

There are also three rows of what are known in the art as "control keys" for the purpose of selecting various totalizers into which the transactions entered into the machine are to be distributed. There is also a row of keys at the extreme right, which is known as the "total control row," which keys control the machine for the purpose of taking totals off the various totalizers at the close of day when it is desired to clear out the machine to render it ready for business the following morning.

DETAILED DESCRIPTION

*Framework and operating mechanism*

Figure 2:
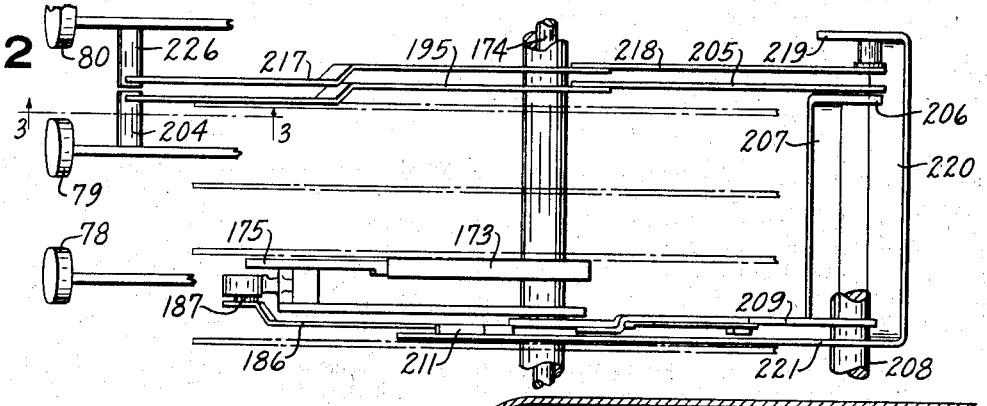
Fig. 2 is a skeleton view of a portion of the mechanism for controlling the operation of the differential mechanism of one bank of transaction keys by certain of the transaction keys in other banks.
Figure 6:
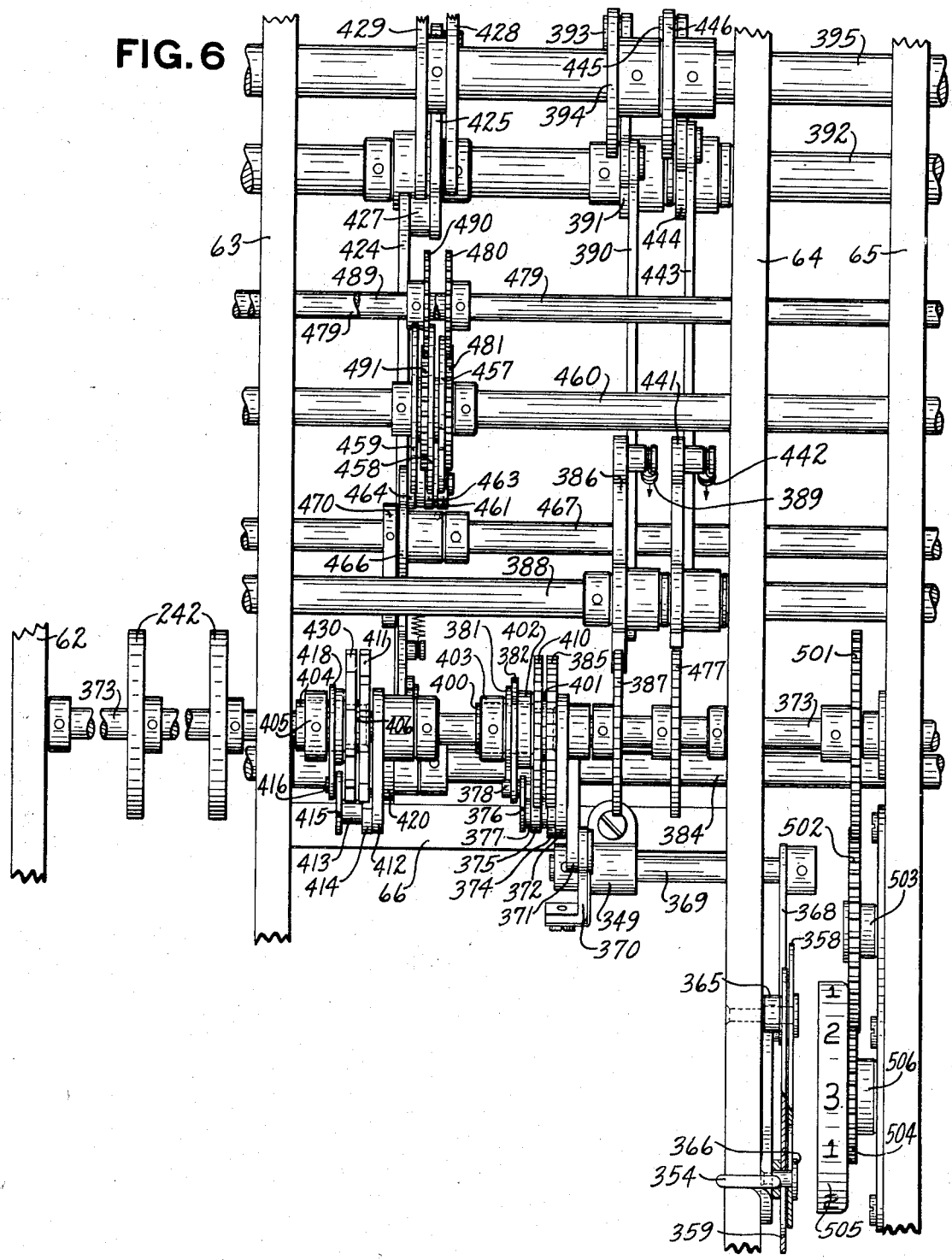
Fig. 6 is a top plan view of the feeding mechanism, together with the line indicator, and both the manual and the automatic means for operating the same.

The machine framework for the machine proper includes a left frame 60 (Figs. 2 and 4) and a right frame (similar to the first-mentioned frame), which support most of the machine mechanism and which frames are, in turn, secured to a base 61 and are further supported in relation to each other by various cross frames, rods, and bars. The base 61 rests on and is secured to four printer frames 62, 63, 64, and 65 (Fig. 6). The printer frames are held in proper relationship to each other by a front tie bar 66 and a rear tie bar (not shown). All four printer frames rest on the surface of a sub-base (not shown).

The machine proper and also the printing mechanism thereof are enclosed in a suitable cabinet 67 (Figs. 3 and 4) having the necessary hinged openings for access to certain parts of the machine by the operator or the proprietor whenever necessary. All hinged openings are provided with suitable locks to prevent unauthorized persons from having access to the inner part of the machine.

The machine may be operated either manually or electrically, preferably the latter. Inasmuch as the operating means is not directly involved in the present invention, such means has not been disclosed herein.

The usual and well-known electric starting bar used on machines of this type has been omitted from the present machine, and, in place thereof, the machine is released for operation by depression of any one of a plurality of so-called "motorized" or "operating" keys located in the three banks of control keys and the bank of total keys. These keys will be explained more in detail later in this specification.

Depression of any of the above-mentioned operating keys releases a key lock shaft 71 (Figs. 3 and 4) to the action of a spring (not shown), which rocks said shaft a slight distance clockwise to operate the clutch mechanism which connects the driving motor to a main shaft 72 journaled in the side frames of the machine. The movement of the shaft 71 simultaneously operates a switch mechanism which closes the circuit to the motor, thus causing the motor to operate.

The illustrated machine is capable of performing either one-cycle operations or two-cycle operations. The main drive shaft 72 receives one complete clockwise revolution during a one-cycle operation and two complete clockwise revolutions during a two-cycle operation. Depression of any one of the control keys will cause the machine to perform a one-cycle operation, while depression of a total key will cause it to perform a two-cycle operation. This machine cycle control mechanism is old and well known in the art, as disclosed in the above-mentioned Shipley patents, and it is, therefore, not thought necessary to show or describe it herein.

After the machine has performed the proper number of cycles to complete the type of operation being executed, the key lock shaft 71 is returned counterclockwise to disengage the clutch mechanism and simultaneously to open the switch to the electric motor. When the machine is operated manually by the use of the well-known hand crank, the operating keys are used for releasing the machine in exactly the same manner as when the machine is operated electrically.

*Keyboard*

A diagrammatic view of the keyboard of the present machine is shown in Fig. 1. From this figure, it will be seen that the left-hand side of the keyboard is composed of two separate groups of amount keys 77 (commonly known in the art as a "split" keyboard), to permit setting up thereon simultaneously two separate amounts, as, for example, the gross amount and the net amount. The right-hand side of the keyboard includes three rows or banks of transaction control keys 78, 79, and 80, as well as the "total control row" of total keys 81, 82, 83, and 84, a "Correction" key 85, and a "Single line" key 86. To the right of the last-mentioned row of keys is a "Release" key 87.

The amount keys 77 are employed to set up amounts to be added into the totalizers as well as to adjust type wheels for printing such amounts. The control keys 78, 79, and 80 are used to control means for selecting the desired totalizer into which the amounts are to be added, as well as to control in which column on the ledger sheet the type wheels will print. The total keys 81, 82, 83, and 84 are used to control the machine for taking totals and sub-totals from totalizers selected by the keys 78, 79, and 80. The "Correction" key 85 controls means for clearing out an "add and subtract totalizer" or "crossfooter" by the method of adding thereon complementary amounts. The "Single line" key 86 is a non-add and stay-down key and is depressed only in connection with the "Gross-net" keys 79 and 80 for printing on a single line in a customer's account space the same gross and net amounts in two different columns on the ledger sheet. After such operations have been performed, the feeding mechanism feeds the record material to a position for printing, which will next occur on the first line of the new customer account space. As mentioned before, the "Single line" key 86 is a stay-down key, and the only way in which it may be released is by depression of the "Release" key 87. Furthermore, the "Single line" key 86 causes the add-subtract totalizer or crossfooter to be thrown out when printing is desired on only one printing line of a customer account space. When it is desired to print simultaneously the gross and the net amounts in both the "Electric charge" column and the "Total bill due" column, it is necessary first to depress the "Release" key 87 and then to depress the proper "Gross-net" transaction key 79 or 80.

*Amount banks and their associated differential mechanisms*

As previously stated, the machine embodying the present invention has two groups of amount keys 77, each group containing five rows or banks of amount keys. Inasmuch as all the rows of amount keys and their associated differential mechanisms are similar in every respect, it is believed that a description of one of these rows of keys and its differential will be sufficient.

Fig. 4 is a transverse sectional view of the machine taken just to the right of one of the amount banks, showing said bank and its associated differential mechanism, which will be considered as representative of all of the amount banks.

The amount keys 77 are mounted in a key bank framework 96 supported by rods 97 and 98 extending between the main frames of the machine. Depression of any one of the keys 77 rocks the zero stop pawl 99 for its related denomination counter-clockwise out of the path of a reset spider 100 free on a hub of an amount differential actuator 101 rotatably supported by a hub 102 extending between two similar amount differential support plates 103 (only one shown here) in turn supported by rods 104 and 105 extending between the machine frames. There is a pair of the support plates 103 for each amount differential, and a tie rod 106 extends through holes in the center of the hubs 102 to secure all of the amount differentials in a compact unit.

A slot in the forward end of the spider 100 (Fig. 4) engages a stud in a latch-engaging arm 107 pivoted on an extension of the actuator 101. The arm 107 and a companion arm 108 together support a differential latch 109 for horizontal shifting movement. A spring 110 urges the arms 107 and 108 and the latch 109 rearwardly to normally hold a foot-shaped projection 111 of said latch in engagement with a shoulder 112 on a differential driving segment 113 rotatably supported on the hub of the actuator 101. A link 114 pivotally connects the driving segment 113 to a cam lever 115 pivoted on a stud 116 in the left-hand one of the plates 103, and said lever 115 carries rollers 117 and 118, which cooperate, respectively, with the peripheries of companion plate cams 119 and 120 secured on the main drive shaft 72. Depression of one of the amount keys 77 moves the lower end thereof into the path of a rounded surface 121 on an extension of the arm 107.

In adding operations, the main shaft 72 and the cams 119 and 120 make one clockwise revolution, causing the lever 115 to rock the driving segment 113 first clockwise and then counter-clockwise back to normal position. During its clockwise movement, the segment 113, by means of the shoulder 112, in cooperation with the extension 101 of the latch 109, carries said latch and the amount actuator 101 clockwise in unison therewith until the rounded surface 121 contacts the stem of the depressed amount key 77. This rocks the latch arm 107 and its companion arm 108 counter-clockwise to disengage the projection 111 from the shoulder 112 to interrupt the clockwise movement of the actuator 101 and to position said actuator in proportion to the depressed amount key 77. Disengaging movement of the latch 109 moves a rounded extension 122 thereof into engagement with the corresponding one of a series of locating notches 123 on a plate 124 secured between the rod 104 and an upward extension of the left-hand support plate 103.

After the latch 109 is disengaged from the shoulder 112 of the segment 113, said segment continues its clockwise movement without interruption, causing an arcuate surface 125 thereof, in cooperation with the sole of the foot-shaped projection 111, to lock the extension 122 of the latch 109 in a notch 123 corresponding to the depressed amount key. When the lever 115 and the segment 113 reach the termini of their initial movements clockwise, a roller 126 carried by said lever 115 engages an arcuate surface 127 on the under side of an amount beam 128 pivoted at 130 to the actuator 101 and forces an arcuate surface on the upper edge of said beam into contact with the hub of said actuator 101 to move the beam 128 to a position corresponding to the depressed amount key 77. The beam 128 has a slot 131, which engages a stud 132 in a link 133, the upper end of which is pivotally connected to an indicator-positioning segment 134 mounted on one of a series of nested tubes 135 supported by a shaft 136 journaled in the side frames of the machine. The lower end of the link 133 is pivotally connected to a segment 137 free on a shaft 138 journaled in the machine side frames. The segment 137 carries a stud 139, which engages a camming slot in a zero elimination cam plate 140 pivotally mounted on a stud 141 in a segmental gear 142 free on a shaft 143 journaled in the side frames of the machine. The teeth of the segmental gear 142 mesh with the external teeth of an external-internal ring gear 144, the internal teeth of which mesh with a pinion 145, which drives a square shaft 146. The square shaft 146, in turn, drives similar pinions 145, meshing with the internal teeth, and gears similar to the gear 144, the external teeth of which gears are adapted to mesh with and drive corresponding denominational type wheels in each row of the column-printing mechanism, which column-printing mechanism in the present case is for the purpose of printing on an inserted slip or ledger sheet, for printing in the different columns and customer account spaces the various items involved in each customer's account.

This method of driving the type wheels of the column-printing accounting machines is fully explained in the previously-mentioned Arnold Patent No. 2,141,332 and embodies an application of the well-known Kreider principle of driving mechanism disclosed in the above-mentioned Kreider Patents No. 1,693,279.

For the purpose of properly alining the differential mechanism and the type wheels set thereby, there is provided on each of the segments 134 a series of notches 147 engaged by an aliner 148 secured to a shaft 149.

The aliner 148 is disengaged from the notches 147 during the differential setting of the type wheels, and, after they have been set under the control of the keys through the differential mechanism, the aliner 148 is again moved into engagement with the notches 147, thus positively alining the type wheels.

The zero elimination mechanism above mentioned, which is for the purpose of controlling the printing of zeros and which is controlled by the above-mentioned zero elimination cam plate 140, is not directly involved in the invention in the present application, and, therefore, no further reference to the zero elimination mechanism will be given herein, such type of zero elimination mechanism being illustrated and described in the above-mentioned Arnold Patent No. 2,141,332.

*Totalizers*

The machine of this invention has two lines of the usual well-known interspersed adding totalizers, located on a rear or No. 2 totalizer line and on a front or No. 3 totalizer line, and, in addition, has one add-subtract totalizer or crossfooter on the No. 1 totalizer line, which is known as the "upper line."

The add-subtract totalizer or crossfooter on the No. 1 line is indicated by the reference numeral 157. The totalizer wheels of the totalizers of the No. 2 or back line are indicated by the number 158, and the number 159 indicates the interspersed totalizers on the front or No. 3 totalizer line.

Totalizers of these types are old and well known in the art and are fully illustrated and described in the previously-mentioned Shipley patents, and, therefore, no further description of the construction of these totalizers is thought necessary herein.

As is usual in machines of this type, the actuators 101 are divided into three tooth sections 160, 161, and 162. The sections 160 actuate the add-and-subtract totalizer or crossfooter on the No. 1 line, the tooth sections 161 actuate the totalizers 158 on the No. 2 line, and the tooth sections 162 actuate the totalizers 159 on the front or No. 3 line.

In adding operations, the wheels of the selected totalizer or totalizers, as the case may be, are engaged with their respective sets of actuating tooth sections 160, 161, and 162 of the actuators 101 after said actuators have completed their setting movement in a clockwise direction under control of the amount keys 77. Return movement counter-clockwise of the actuators 101, as above explained, rotates the corresponding wheels of the selected and engaged totalizer or totalizers in proportion to the value of the depressed amount keys 77 to enter into said totalizers the amount corresponding to the keys depressed.

In subtract operations, the corresponding subtract wheels of a balance totalizer or crossfooter 157 are engaged with the teeth 160 of the actuator 101 exactly the same as in adding operations, and the return movement of the actuators reversely rotates the adding wheels 157 of the crossfooter through the reverse gearing shown in Fig. 4, which is well known in the art and shown in the above-mentioned Shipley Patent No. 1,916,535.

If no amount key 77 (Fig. 4) is depressed, the zero stop pawl 99 remains in the path of the spider 100 upon initial movement of the actuator 101 and engages said spider and breaks the latch 109 to locate said actuator in zero position. After the actuator 101 is positioned at zero, the roller 126 positions the beam 128, the link 133, and the segments 134 and 137 to corresponding positions, as shown in Fig. 4. At the end of any type of operation, the actuator 101 is always returned to home position, as shown in Fig. 4. However, the links 133 and the indicating and printing mechanisms controlled thereby remain in set positions at the end of machine operations and are moved directly from these positions to their new positions in the succeeding operations of the machine through the beam mechanism, which is old and well known in the art and is often referred to as the "minimum movement device." The usual tens transfer mechanism is provided for transferring tens amounts between lower and higher denominations in adding and subtracting operations.

*Transaction keys*

As heretofore mentioned, the present machine is provided with three banks or rows of transaction keys 78, 79, and 80. The greater number of these keys may be classified into two separate groups, one group comprising consumption keys and the other group comprising gross-net keys.

The consumption keys are identified by the abbreviation "Cons." appearing thereon. These are machine-release keys and are used in connection with the left-hand group of amount keys 77 for selectively adding upon certain of the totalizers on lines 2 and 3, as well as for controlling the printing mechanism to print, in the vertical columns on the ledger sheet (Fig. 16) bearing the heading "K. w. hours used," the amounts of different kinds of consumption used. In addition, the "Cons." key 80 causes such amounts to be entered into the minus side of the crossfooter on the totalizer line No. 1. The "Flat rate" "Cons." key 78 in row 1 does not affect the selection of any of the totalizers, but merely controls the printing mechanism to print in the "K. w. hours used" column on the ledger sheet.

The gross-net keys 78, 79, and 80 are identified by the words "Gross-net" appearing thereon, and are used in connection with both groups of amount keys 77 for adding into the plus side of the crossfooter on the totalizer line No. 1, as well as for controlling the printing mechanism to print simultaneously in either the "Electric ch'g." column or in the "Total bill due" column or in both of said columns on the ledger sheet both the gross amount and the net amount.

The remaining transaction keys not yet described are all in row 1 and include the "Eject," "Release lock-proof," "Present," "Demand," "Previous," and "Credit" keys 78.

The "Eject" key 78 is a machine-release key and controls means for ejecting a card from the machine, upon which card is printed substantially the same data, at the same time, as that printed on the ledger sheet. Since this key is not involved in the present invention, no further description thereof will be given.

The "Release lock-proof" key 78 is not directly involved in the present invention and will, therefore, be only briefly described herein. This key is used, when an error has been made, to release the key lock line to release the machine for operation by another transaction key. For example, when registering the amount of electricity consumed, the operator takes from an already-compiled report the present meter reading, the previous meter reading, and the amount of electricity consumed, which latter amount is the difference between the first two mentioned readings. Take, for example, the account of Richard Doe, shown on the ledger sheet in Fig. 16. The operator first sets up on the left-hand group of amount keys 77 the present meter reading, which in this case is 99,078, and depresses the "Present" key 78, which latter key selects the plus side of the crossfooter of the No. 1 totalizer line, into which such amount is to be added, and, at the same time, selects the vertical column headed "Meter readings—present" on the ledger sheet, in which such amount is to be printed. The next step taken by the operator is to set up on the left-hand group of amount keys 77 the previous meter reading of 99,000 and depress the "Previous" key 78, which latter key selects the minus side of the crossfooter upon which to add such amount and at the same time selects the vertical column headed "Meter readings—previous," in which such amount is to be printed.

Since the wheels on the plus side of the crossfooter normally stand at 00000, while the wheels on the minus side stand at 99999, it will be obvious from the above statement that the previous amount of 99,000 entered upon the crossfooter will be subtracted from the present amount of 99,078, thereby leaving the amount of 78 standing on the plus side of the crossfooter, the latter figure being the proper amount of electricity consumed.

Now, for the next step, or third machine operation, the operator should set up on the left-hand group of amount keys 77 the amount of 78, but for the purpose of illustration we will say that the operator erroneously sets up 68 on the keys and depresses the "Residential cons." key 80. This causes the amount of 68 to be subtracted from the crossfooter, leaving the latter not at zero but in a state where 10 is still on the plus side thereof. The operator does not know that a mistake has been made and therefore proceeds to set up the gross and net amounts of 3.36 and 3.20 and depresses the "Residential gross-net" key 79, only to find that the latter fails to release the machine for operation, because the crossfooter is not at zero, due to the error made in the last transaction. The operator then manually removes the ledger sheet from the machine and checks the amount previously printed thereon with the amount appearing on the report, thus noticing that 68 was entered instead of 78, thereby leaving 10 on the plus side of the crossfooter.

In order to restore the crossfooter to the condition in which it was before the error was made, the operator now sets up on the left-hand group of amount keys 77 the complement 99,932 and depresses the "Release lock-proof" key 78 in combination with the "Residential cons." key 80, whereupon the amout of 99,932 is entered upon the minus side of the crossfooter and consequently subtracted from the plus side thereof, thereby restoring the amount of 78 on the plus side of the crossfooter. The complementary amount is printed in the "K. w. hours used" on the ledger sheet to show that the error has been corrected. The crossfooter now stands where it did before an error was made. The operator then merely sets up on the left-hand group of amount keys 77 the correct amount of consumption, which is 78, and depresses the "Residential cons." key 80, thereby causing the amount of 78 to be printed in the proper column on the ledger sheet and the crossfooter to be returned to zero.

The "Present" key 78 is a machine-release key and is used in connection with the left-hand group of amount keys 77 for entering the amount of the present meter reading into the plus side of the crossfooter on the No. 1 totalizer line and for controlling the printing mechanism to print such amount in the "Meter reading—present" column on the ledger sheet.

The "Flat rate gross-net" key 78 is a machine-release key and is used in connection with both groups of amount keys 77 for adding into the plus side of the crossfooter on the totalizer line No. 1, as well as for controlling the printing mechanism to print simultaneously either in the "Electric ch'g." column or in the "Total bill due" column, on in both of said columns on the ledger sheet, both the gross amount and the net amount due. This key also controls the differential mechanism associated with the row 2 group of keys 79 to add into the totalizer on line No. 2 corresponding to the zero position in such row.

The "Flat rate cons." key 78 is a machine-release key and is used in connection with the left-hand group of amount keys 77 to control the printing mechanism to print consumption flat rate. This key controls the printing only.

The "Demand" key 78 in row 1 is a machine-release key and is used in connection with the right-hand group of amount keys 77 to control the printing mechanism to print a "demand" rate, which is a special rate based upon a predetermined consumption.

The "Previous" key 78 is a machine-release key and is used in connection with the left-hand group of amount keys 77 for entering an amount representing a previous meter reading into the minus side of the cross-footer on the No. 1 totalizer line and for controlling the printing mechanism to print such amount in the "Meter reading—previous" column on the ledger sheet.

The "Credit" key 78 is a machine-release key and is used in connection with the amount keys 77 for entering a eredit amount into the minus side of the crossfooter and into a totalizer on line No. 3 corresponding to the position indicated on the keyboard (Fig. 1) by dotted lines encircling the word "Key—1." This key also controls the selection of the proper column on the ledger sheet in which the amount is to be printed.

From the above it will be noted that all of the keys 78 in row one are machine-release keys except the "Release lock-proof" key 78, which merely releases the lock line to permit operation of the machine by one of the other keys. The two key positions in row one which contain no keys but are indicated by dotted lines surrounding the words "Auto-pos. keys 22 to 27" and "Auto-pos. key 21" identify the positions in which the differential mechanism associated with such bank of keys is adjusted by certain keys 79 and 80 in rows two and three.

It is to be understood that the captions on the transaction keys 78, 79, and 80 do not have to be as they are shown here, these being merely for illustrative purposes. Many businesses desire other types of breakdown, and the captions on the keys can be changed to correspond to the type of breakdown used in the particular system for which the machine is intended to be used.

The differential mechanisms associated with the three rows of transaction keys 78, 79, and 80 are substantially the same, and therefore a description of the row of keys 78 and the differential mechanism associated therewith will suffice for all. As this differential mechanism is similar to the amount differential mechanism described above and is fully illustrated and described in the patents referred to hereinbefore, only a brief description thereof will be necessary herein. As above stated, these keys 78 control the transaction differential mechanism, which selects the totalizers corresponding to the keys and which positions the printing wheels for printing symbols corresponding to the keys. This particular differential mechanism also controls the mechanism for selecting one or more of the vertical columns on the ledger sheet to be printed in, which will be described more in detail hereinafter.

Figure 3:
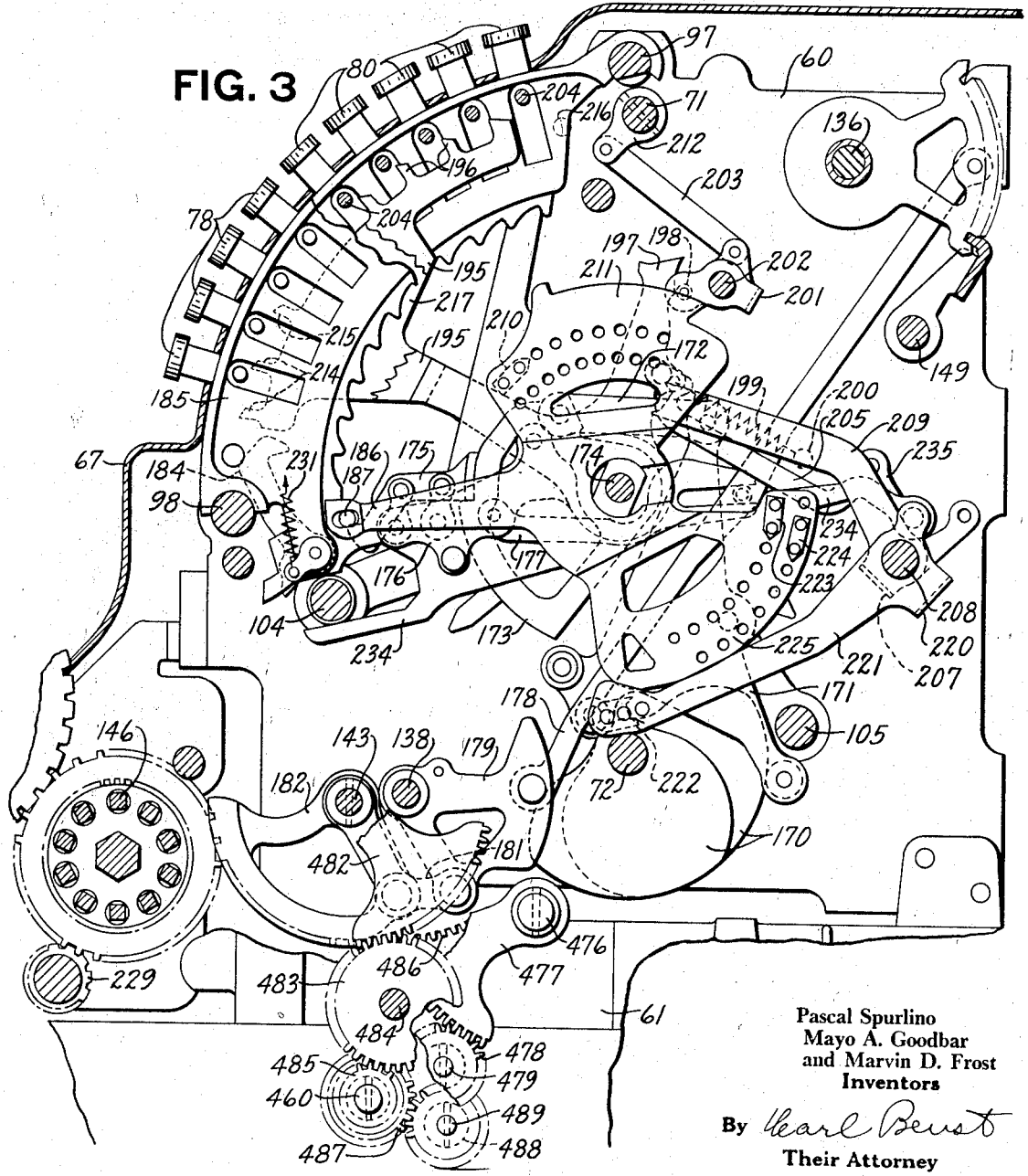
Fig. 3 is a sectional view of the machine, taken to the right of the first bank of transaction keys, looking toward the left-hand end of the machine and partially broken away to show certain of the mechanisms more clearly.

The differential mechanism associated with the first control bank, or row one, which is controlled by the keys 78 and certain of the keys 79 and 80 in rows two and three, is illustrated in Fig. 3 and will be briefly described, as it is similar to the control differentials illustrated and described in the previously-mentioned Shipley Patent No. 1,916,535.

The drive shaft 72 carries a pair of cams 170 for operating a lever 171 connected by a link 172 to the usual driving segment 173. The driving segment 173 and other parts of the differential mechanism are supported by a rod 174.

Clockwise movement of the driving segment 173, through the usual latch 175 carried by a differentially-adjustable arm 176 supported by the rod 174, rocks the arm 176 clockwise until the forward end of the latch 175 contacts whichever one of the keys 78 is depressed, at which time the latch is separated from the driving segment, permitting the arm 176 to remain in the position to which it has been driven under control of the depressed key 78.

The differential arm 176 carries the usual minimum-movement beam 177 connected to a link 178 fastened to an arm 179 loose on the shaft 138 supported by the machine side frames. A link 181 connects the arm 179 with a segment 182 secured to the shaft 143 carried by the side frames of the machine. The segment 182, by means not shown, sets a symbol type wheel to print on a ledger sheet, as disclosed in the above-mentioned Arnold patent.

The shaft 143, through means to be later considered in detail, operates certain control means in the printer, depending upon the type of entry being made upon the ledger sheet.

The usual zero stop pawl 184, carried by a frame 185, in which the transaction keys 78 are slidably mounted, is adapted to cooperate with an arm 186 supported by the rod 174 and is provided with a slot to cooperate with a pin 187 of the latch 175 for this bank of keys 78. The zero stop pawl 184 is normally in an ineffective position, for a purpose to be described later.

Under certain conditions it is necessary to control this differential mechanism (Fig. 3), which, it will be recalled, is associated with row one, by certain of the keys 79 and 80 in rows two and three.

The bank of transaction keys 78 of row one is shown cut away in Fig. 3 to show certain of the transaction keys 80 in row three. Such cut-away portion of Fig. 3 was taken on line 3—3 of Fig. 2, looking in the direction of the arrows. Since the control of the differential mechanism associated with the row one bank of keys 78 (shown in Fig. 3) by the keys in other rows is similar to the control illustrated and described in the previously-mentioned Shipley Patent No. 1,916,535, only a brief description thereof will be given herein.

Associated with the transaction keys 79 in row two is a lever 195 (Figs. 2 and 3) pivotally mounted on the rod 174. The lever 195 has integral therewith a plurality of stop lugs 196, one for each of the keys 79. Also formed integral with the lever 195 is an upwardly extending arm 197 normally held against a stud 198 by a spring 199, one end of which is fast to the arm 197 and the other end of which is secured to a stud 200 carried by the hanger plate. The stud 198 is carried by one arm of the yoke 201 pivotally mounted on a rod 202 suitably mounted in the hanger plates associated with the transaction banks of keys 78, 79, and 80. Said arm of the yoke 201 is connected by a link 203 with an arm 212 pinned to the key lock shaft 71. Thus, upon the release and clockwise movement of the key lock shaft 71, previously described, the yoke 201 will thereby be rocked counter-clockwise, moving the stud 198 away from the arm 197 on the lever 195. This permits the spring 199 to rock the arm 197 and the lever 195 clockwise. If one of the keys 79 has been depressed, the appropriate lug 196 will strike the usual pin 204 mounted in the side of the depressed key and thereby arrest the clockwise movement of the lever 195.

The lever 195 is connected by a link 205 to an arm 206 of a yoke 207 freely mounted on a rod 208 suitably supported in the hanger plates. The yoke 207 has another arm 209, which is adapted to coact with a lug 210 on a plate 211 integral with the arm 186. Clockwise movement of the lever 195 will, through the link 205 and the yoke 207, impart a corresponding clockwise movement to the arm 209 to position the free end thereof in the path of movement of the lug 210. Thus, when the actuator 176, together with the arm 186, is moved clockwise by the segment 173, with no key 78 depressed but with any one of the keys 79 depressed, as above mentioned, the lug 210 will strike the free end of the arm 209, thereby arresting clockwise movement of the arms 176 and 186 by causing the latch 175 to be disengaged from the driving segment 173. The lug 210 has been positioned on the plate 211, so that, when it encounters the end of the arm 209, which has been moved into its path of movement, it will cause the differential mechanism for row one to be stopped in the eighth position. This will, through a train of mechanism previously described, impart a corresponding adjustment to the shaft 143, which in turn controls the adjustment of the proper printing wheels and the selection of the plus side of the crossfooter on the No. 1 totalizer line.

If no key in either row one or row two is depressed, the lever 195 will move clockwise until stopped by a stud 216 carried by the hanger plate. This will cause the arm 209 to be rocked far enough in a clockwise direction to clear the path of movement of the lug 210. When the key lock line 71 is restored to its home position near the end of operation of the machine, the stud 198 will coact with the arm 197 to return the lever 195 and its associated parts to their normal positions.

The "Miscel. gross-net" and the "Guar. adjustment gross-net" keys 80 in row three also control the disengagement of the differential latch associated with row one in the eighth position. The "Repair servicing gross-net" key 80 in row three controls the latch of row one so that it is disengaged in the seventh position. The disengagement of the latch in either one of these two different positions causes the plus side of the cross-footer on the totalizer line No. 1 to be selected for operation. The means by which said keys perform this function will now be described.

Associated with the row three transaction keys 80 is a lever 217 (Fig. 2), which is similar to, and operates in the same manner as, the lever 195 described in connection with the row two transaction keys 79. The lever 217 is freely mounted on the rod 174 and has an arm like the arm 197, which is affected by the operation of the key lock shaft 71 in the same manner as the last-mentioned arm. The lever 217 is connected by a link 218 to an arm 219 of the yoke 220 freely mounted on the rod 208. The yoke 220 has another arm 221, which carries near its free end a stop 222 adapted to be moved into the path of movement of either a lug 223 or a lug 224 on the plate 225 formed integral with the arm 186. When the stop 222 is moved into the path of the lug 223, it will coact with the latter to stop the clockwise movement of the differential arm 186 in its eighth position. On the other hand, should the stop 222 be positioned to coact with the lug 224, it will stop the differential arm 186 in its seventh position.

The arm 221 is given a long throw to place the stop 222 into cooperative relation with the lug 223 and a short throw to position the stop for cooperative relation with the lug 224. This is accomplished by a variable spacing of stop lugs 214 and 215 on the lever 217. The distance between the lugs 214 and the pins on the "Miscel. gross-net" and the "Guar. adjustment gross-net" keys 80 in row three is such as to permit sufficient clockwise movement of the lever 217 to cause a long throw to be given the arm 221 and the stop 222 to effectively position the latter with respect to the lug 223. On the other hand, the distance between the lug 215 and the pin on the "Repairs servicing gross-net" key 80 in row three is reduced so as to limit the clockwise movement of the lever 217 and thus cause only a short throw to be given to the arm 221 and the stop 222, thereby effectively positioning the latter with respect to the lug 224.

If any of the six uppermost transaction keys 80 in row three (which are consumption keys) is depressed, the differential mechanism associated with the row one keys 78 will be disengaged in its zero position to select the minus side of the cross-footer for operation. The manner in which this result is accomplished will now be described.

There are no stop lugs on the lever 217 to coact with the pins 226 carried by the upper six consumption keys 80. Consequently, when one of these keys is depressed, the lever 217 will not be prevented from receiving the full clockwise movement permitted by the stud 216. This will result in both of the arms 209 and 221 being moved clockwise beyond the paths of movement of the lugs 210, 223, and 224. This will cause the means by which normally held the zero stop pawl 184 in ineffective position to release said pawl to permit the latter to stop the differential arm 176 of the first bank of keys 78 in its zero position. Means for thus controlling the operation of the zero stop pawl will now be described.

A spring 231 (Fig. 3) constantly tends to rock the zero stop pawl 184 clockwise into the path of movement of the arm 186, but is prevented from doing so by a stud 232 (Fig. 5) carried by said pawl contacting an upwardly extending projection 233 integral with the bifurcated end of a slide 234. The bifurcated end of the slide 234 embraces the rod 104, while the other end is pivoted to an arm 235 freely mounted on the rod 208. A spring 236, one end of which is fastened to the slide 234 and the other end of which is secured to the hanger plate, constantly tends to move the slide 234 toward the right, but is normally prevented from doing so by the yokes 207 and 220. It is only when both of the levers 195 and 217 are allowed to rock the full extent of their clockwise movement that the yokes 207 and 220 are rocked sufficiently clockwise to permit the spring 236 to rock the arm 235 and the slide 234 far enough to the right, moving the projection 233 away from the stud 232, to allow the spring 231 to rock the zero stop pawl 184 into its effective position. The spring 231, at this time, rocks the pawl 184 clockwise sufficiently to position the latter in the path of movement of the arm 186, whereby the differential latch 175 will be disengaged in its zero position.

Printing mechanism

The printing mechanism used in connection with the present invention is of the column-printer type shown in the above-mentioned Arnold Patent No. 2,141,332 and is capable of printing the same amounts and other data in various columns on suitable record material. The amount keys 77 differentially control the setting of the segments 142 (Fig. 4), as heretofore described. The method of driving the type wheels 229 (only one of which is shown in Fig. 4) from the differentially-positioned segments 142 is by means of the ring gears 144, which have external and internal teeth. These gears 144 are positioned by their external teeth, and the pinions 145 driven by the internal teeth operate the square shaft 146 carrying similar pinions, one for each column in which printing is to be duplicated. The latter pinions drive gears (not shown) which drive the type wheels 229.

The transaction keys 78, 79, and 80 (Fig. 3) control the positioning of segments 182, which, in turn, through the same type of mechanism as that just above described, position symbol-printing wheels 229 for printing symbols in the different columns of record material.

The above-mentioned method of driving type wheels is fully disclosed in the previously-mentioned Kreider Patent No. 1,693,279, and reference may be had thereto for a full understanding of the same.

To print from the type wheels on the record material (shown in Fig. 16), there is provided a plurality of impression hammers 230 (Fig. 10), only one of which is shown.

Manually-operable "on" and "off" means for controlling operation of the machine The present machine is provided with manually-operable means for controlling the operation thereof. This means includes a lever 237 (Fig. 12) formed integral with the disc 238 secured to an internal-external gear 239 driving the usual square shaft and pinion, which in turn drive another internal-external gear which meshes with a further internal-external gear 240. This type of driving mechanism is old and well known, as disclosed in the before-mentioned Kreider patent, and, therefore, will not be described herein. The lever 237 has two positions of adjustment; namely, "on" and "off" positions. When the lever 237 is in its "off" position, it controls means for locking the release shaft 71, holding pressure rollers 241 out of cooperative relation with record material feed rollers 242 (Fig. 12, 13, and 17), and maintaining stops 243 in the path of the record material, to thereby prevent the latter from being inserted beyond a certain point in the machine.

Movement of the lever 237 from the "off" to the "on" position will locate a notch 244 (Fig. 12) formed in the periphery of the disc 238 opposite an alining pin 245 carried by one arm of a lever 246 pivoted on a stud 247 in the side frame. When this occurs, a spring 248 will rock the lever 246 clockwise to engage the pin 245 with the notch 244 and thus retain the disc 238 and the lever 237 in such "on" position until such time as they are manually returned to the "off" position.

The above-mentioned clockwise movement of the lever 246 will, through a link 249 connecting the lever with an arm 250 secured to a shaft 251, supported by the printer frame, impart counter-clockwise movement to the shaft 251. Secured to the shaft 251 is an arm 252 connected by a link 253 (Figs. 10 and 11) to an arm 254 pivoted on a stud 255 mounted in the machine side frame. This arm 254 normally coacts with a flat-sided stud 256 mounted on a release lever 267 secured to the release shaft 71. The lever 267 and its function are old and well known in the art, as disclosed in the above-mentioned Shipley and Arnold patents, and will not be described herein. With the arm 254 coacting with the stud 256, an interlock is thereby provided which prevents clockwise movement of the release shaft 71, which movement is necessary to release the machine for operation. From the foregoing it will be seen that the counter-clockwise movement given to the shaft 251 will through the arm 252 and the link 253, rock the arm 254 out of cooperative relation with the stud 256 and thereby unlock the machine for operation.

When the lever 237 is moved to its "on" position, it will, through the internal-external gear drive mechanism above referred to, rotate the gear 240 counter-clockwise. When this occurs, a camming surface 257, forming a portion of the periphery of the gear 240, will coact with the roller 258 carried by an arm 259 secured to a shaft 260 to rock said arm and said shaft counter-clockwise. The shaft 260 is suitably journaled in a pair of brackets 261 (Figs. 12 and 17) fast to a flange formed on the base plate 61. Pivotally mounted on the shaft 260 is a pair of yoke members 262, each of which has rotatably mounted therein one of a pair of pressure rollers 241, previously mentioned. Each of the yoke members 262 is connected by a torsion spring 263 (Figs. 13 and 17) to one of a pair of arms 264 fast to the shaft 260. The pressure rollers 241 are normally held out of cooperative relation with the feed rollers 242 by projections 265 on the arms 264 coacting with the under side of studs 266 carried by the yoke members 262. When the shaft 260 is rocked counter-clockwise, as above described, the projections 265 on the arms 264 are moved away from the studs 266, thereby permitting torsion springs 263 to rock the yoke members 262 counter-clockwise to bring the pressure rollers 241 into cooperative relation with the feed rollers 242.

Also, when the lever 237 is moved to its "on" position, the above-mentioned record material stops 243 (Figs. 12 and 17) will thereby be removed from the path of feed of the record material. The stops 243 are formed on the ends of levers 276 pivotally mounted on a shaft 277 suitably journaled in the printer frames. The means for accomplishing this result will now be described.

Secured to the shaft 260 (Fig. 12) is a lever 278 normally urged in a clockwise direction by a spring 279, one end of which is fast to said lever, while the opposite end is secured to an arm 280 fast to the shaft 277. The lever 278 has a cam slot 281, which coacts with a roller 282 carried by the arm 280. A spring 283 constantly tends to hold the lever 276 so that the stop 243 thereof will be in effective stopping relation with respect to any inserted record material. Also secured to the shaft 277 are two arms 284, which normally coact with pins 285 on the levers 276 to limit the counter-clockwise movement which the springs 283 impart thereto.

Upon moving the hand lever 237 from "off" to "on" position, with the resultant counter-clockwise movement of the shaft 260, the lever 278 is rocked counter-clockwise, and the cam slot 281 and the roller 282 rock the arm 280, the shaft 277, and the arms 284 clockwise. This causes the arms 284, through the pins 285, to rock the levers 276 clockwise and remove the stops 243 out of the path of any inserted record material, so that the latter can be fed further into the machine, as will be later described, to receive additional printed records.

*Manually-settable symbol-printing mechanism and automatic means for restoring said mechanism to home position*

There is provided in the present machine a manually-settable symbol-printing mechanism which, when positioned to print a symbol, will be automatically restored to home position near the end of the operation.

The means for accomplishing this result includes a hand-operated lever 295 (Figs. 10 and 15) formed integral with a disk 296 secured to an internal-external gear 297 driving the usual square shaft and pinions, which in turn drive another internal-external gear 294 directly in mesh with the symbol type wheel 229. The gear 294, through the square shafts 293 and pinions (not shown), drives an internal-external gear 298 for a purpose to be later described. This type of drive is the usual and well-known Kreider type of mechanism, heretofore referred to, and no further description of this particular driving mechanism is felt necessary herein.

The disk 296 (Fig. 15) has secured thereto an index plate 300 bearing data identifying the various positions of adjustment which may be manually given to such disk. The disk 296 is shown in its home position in Figs. 10 and 15. The disk 296 is enclosed in a suitable casing 301 provided with a slot through which the lever 295 projects and is adapted to be moved. The casing 301 is also provided with an opening 302 (Fig. 10) for the purpose of displaying to the operator the index plate 300, in order to determine the proper positioning of the disk 296.

The disc 296 (Figs. 10 and 15) is provided with alining notches 303 adapted to coact with the pin 304 on a lever 305 pivoted on a stud 306 carried by one of the machine side frames. The pin 304 is normally held out of cooperation with the notches 303 until the "on" and "off" lever 237, previously described, is moved to its "on" position, at which time such pin will be moved into cooperative relation with the notches. The manner in which this condition is brought about will now be described.

The lever 305 is connected by a link 307 to an arm 308 pivotally mounted on the shaft 251. The arm 308 is secured to another arm 309 also freely mounted on the shaft 251. The arm 252 has a straight slot 310, and the arm 309 has a cam slot 311, through which projects a stud 312 carried by the upper end of a link 313, the lower end of which is pivoted to a bell crank 314 carrying a roller 315 held in contact with a cam 316 by a spring 317. The cam 316 is secured to a gear 318 journaled on a stud 319 carried by the left side frame 60. The gear 318 is driven by the usual operating motor (not shown) and meshes with a gear 320 on the main shaft 72 to drive the same. The purpose of the cam 316 will be described later. When the shaft 251 is rocked counter-clockwise, due to the movement of the lever 237 to its "on" position, the arm 252 is rocked counter-clockwise until a projection 321 thereon strikes a cross bar 322 connected to the side frames 60 and 67 of the machine. Such counter-clockwise movement of the arm 252, through the stud 312 and the slots 310 and 311, rocks the arm 309 counter-clockwise. Since the arm 309 is secured to the arm 308, the latter arm is also moved counter-clockwise and, through the link 307, rocks the lever 305 clockwise to engage the alining pin 304 with the adjacent notch 303 on the disc 296. With the alining means for the disc 296 thus rendered effective, the operator may move the lever 295 to the proper position for causing the type wheels 229 to print the desired symbol on the record material. During such movement of the lever 295, the alining pin 304 is ratcheted over the points between the notches, and a spring 323 causes the pin 304 to engage the notch 303 appropriate to the setting of the lever 295.

Means is provided for automatically returning the disc 296 and the type wheels 229 set thereby to their home positions near the end of the operation of the machine. The method employed for accomplishing this result will now be described.

The internal-external gear 298, above mentioned meshes with teeth on a segment 325 freely mounted on the previously-described shaft 143. The segment 325 is secured to an arm 327 also pivoted on the shaft 143 and connected by a link 328 to an arm 329 loosely mounted on a rod 330 also supported in the machine side frames 60 and 67. Secured to the arm 329 is an arm 331 carrying a roller 332 adapted to cooperate with a cam 333 secured to a shaft 334. This shaft 334 is in axial alinement with the drive shaft 72 and is driven from the shaft 72 by a clutch mechanism comprising a disc 335 (Fig. 10) secured to the shaft 72. Pivoted on the disc 335 are a drive pawl 336 and a retaining pawl 337 engaging opposite sides of a lug 338 of a collar 339 secured to the shaft 334. A spring 340 normally holds said pawls in engagement with the lug 338. Clockwise movement of the shaft 72 and the disc 335 causes the pawl 336 to turn the lug 338, the collar 339, and the shaft 334 clockwise. During the first cycle of a sub-total or a total operation, during which operations the shaft 72 receives two rotations in the well-known manner, an arm 341 is moved into the path of travel of a finger 342 on the pawl 336 and causes said pawl to be disengaged from the lug 338, and therefore the shaft 334 remains idle during the first cycle of all sub-total and total operations. The means for moving the arm 341, as above mentioned, is fully illustrated and described in the above-mentioned Shipley Patent No. 1,619,796.

When the disc 296 is moved to one of its symbol-printing positions, it will, through the internal-external drive mechanism previously described, rock the segment 325 and the arm 327 counter-clockwise, whereupon the link 328 and the arm 329 rock the arm 331 counter-clockwise to position the roller 332 above the cam 333. This positioning of the roller 332 varies, depending upon the setting of the disc 296.

As above mentioned, the shaft 334 receives one complete clockwise rotation during each single-cycle operation and during the second cycle of sub-total and total operations of the machine. Near the end of the clockwise rotation of the shaft 334, the cam 333 will contact the roller 332 and rock the arms 331 and 329 clockwise to their home positions, whereupon the link 328 and the arm 327 will rock the segment 325 clockwise and, through the internal-external drive mechanism previously mentioned, restore the disc 296 counter-clockwise to its home position.

To prevent the alining pin 304 from bobbing in and out of the notches 303 during the restoring movement of the disc 296, the cam 316, above described, is so timed that, just prior to the restoration of the disc 296, the bell crank 314 is rocked counter-clockwise, thus lowering the link 313, whereupon the pin 312, acting in the cam slot 311, rocks the arms 309 and 308 clockwise, thus raising the link 307 and rocking the lever 305 counter-clockwise against the tension of the spring 323 to hold the pin 304 completely disengaged from any of the notches 303. This eliminates friction and noise. Near the very end of the operation, the cam 316 restores the link 313 and the parts above mentioned, whereby the pin 304 again engages the first or upper notch 303.

*Feeding mechanism*

In the instant machine, ledger sheets 350 (Figs. 16 and 17) are presented to a line-spacing and feeding mechanism by the operator. The stop 243 (Fig. 12) controls the positioning of the ledger sheet 350 for printing on the first printing line of the customer's account space located at the top of the sheet. Before operating the machine, the operator first moves the "on" and "off" lever 237 to the "on" position, which causes the pressure roller 241 to be moved into cooperative relation with the feed rollers 242 preparatory to feeding a ledger sheet 350 during any subsequent operation. Also, such adjustment of the lever 237 unlocks the shaft 71, so that the machine can be released for operation by depression of any of the proper "motorized" transaction keys 78 to 80 inclusive, total keys 81 to 84, inclusive, and Correction key 85, as hereinbefore explained.

The entries on one line generally consist of the results of several machine operations. In a great many instances, the printing of the various items chargeable to a customer's account may involve the printing of a number of different items on one or more of the three printing lines included in each customer's account space. In printing on the different lines of a customer's account space, manual means is used to operate the feeding mechanism to feed the ledger sheet 350 from the first line to the second and third lines, or in some instances back to a line previously printed on, in a customer's account space. Automatic means is provided for operating the feeding mechanism, when the total of all the items chargeable to a customer's account is printed, to feed the ledger sheet 350 to the first printing line of the next customer's account space, regardless of which line in the last customer's account space printing occurred on. The feeding mechanism will now be described.

The operator presents the ledger sheet 350 to the printing mechanism (Fig. 12) by inserting said sheet into a throat formed by a guide bar 351 and a table 352, which guides said ledger sheet between the column-printing type wheels 229 and their associated hammers 230 (Fig. 10), then between the ledger sheet feed discs or rollers 242 (Fig. 17) and their associated pressure rollers 241, and finally into contact with the stops 243 on the levers 276. The table 352 is mounted on the top edges of the frames 62 to 65 inclusive. The guide plate 353 is suitably mounted above the table 352 to further assist in guiding the ledger sheet 350 between the pressure rollers and the feed rollers and into engagement with the stops 343.

*Manual means for operating the feeding mechanism*

The manual means for operating the feeding mechanism enables the operator to feed the ledger sheet 350 either forward or backward, one line at a time, to print on any desired printing line in any of the customer account spaces on said sheet. Such means includes a hand-operated lever 354 (Figs. 6 and 7) pivoted on a stud 355 carried by the printer frame 364. The lever 354 is normally maintained in a neutral position intermediate the forward and rearward positions determined by studs 356 and 357, respectively, mounted in one of the printer frames 64. A pair of restoring and centering slides 358 and 359, connected together by a spring 360, normally maintains the lever 354 in its intermediate or neutral position.

Whenever the lever 354 is moved either forwardly or rearwardly, the slides 358 and 359 will automatically return the lever to its normal neutral position. The slide 358 has two slots 361 and 362, while the slide 359 has two similar slots 363 and 364. The slides 358 and 359 are mounted upon two studs 365 and 366, the stud 365 being mounted in the printer frame 64 and projecting through the slots 361 and 363, while the stud 366 is mounted on the hand-operated lever 354 and projects through the slots 362 and 364. In the normal position of the slides 358 and 359, the studs 365 and 366 are located adjacent the left end walls of the slots 361 and 362 in the slide 358 and adjacent the right end walls of the slots 363 and 364 in the slide 359. With such an arrangement, the lever 354 will always be automatically returned from either its forward or rearward position of adjustment to its neutral or home position, where it will be normally maintained by such means.

The lower arm of the lever 354 is bifurcated to embrace a stud 367 in an arm 368 fast to a shaft 369 suitably mounted in the frame 64 and a bearing block 349 secured to the frame 66. Also secured to the shaft 369 is an arm 370 connected by a link 371 to an arm 372 loosely mounted on the shaft 373. The shaft 373 is suitably journaled in the printer frames and has secured thereon the two record material feed rollers 242, previously referred to. A pair of feed pawls 374 and 375 and an arm 376 (Fig. 8), all of which are secured together and operate as a single unit, are pivotally mounted on a stud 377 secured in the arm 372. The arm 376 carries a stud 378 normally positioned between two projections 379 and 380 of arms 381 and 382, respectively, which are loosely mounted on the shaft 373, in a manner later described, and connected together at their upper ends by a spring 383. The spring 383 normally maintains the lower ends of the arms 381 and 382 in contact with a centering rod 384 suitably mounted in the printer frames. When the arms 381 and 382 are thus positioned, the projections 379 and 380 coact with the stud 378 on the arm 376 to normally maintain the pawls 374 and 375 in ineffective positions.

When it is desired to feed the ledger sheet 350 further into the machine (to the right as viewed in Figs. 7, 9, and 12), the operator manually moves the lever 354 toward the right (Fig. 7), thereby rocking the arm 368, the shaft 369, and the arm 370 in a counter-clockwise direction. The arm 370, in turn, through the link 371, rocks the arm 372 clockwise. When this occurs, the projection 380 on the arm 382, through the action of the spring 383, acts to yieldingly hold the stud 378 against clockwise movement relative to the shaft 373, thus causing the unit comprising the arm 376 and the feed pawls 374—375 to rock clockwise, using the stud 377 as a pivot, to engage the pawl 374 with the teeth of a line-spacing ratchet 385 (Fig. 8) secured to the shaft 373 in a manner to be described later. As the arm 372 continues to move clockwise, the pawl 374 moves the ratchet 385, the shaft 373, and the feed rollers 242 secured thereon one step in a clockwise direction, which feeds the ledger sheet 350 farther into the machine one line-space.

A retaining pawl 386 (Figs. 6 and 7) normally coacts with the teeth of a serrated alining disc 387 secured to the shaft 373 to maintain the line-spacing ratchet and the feed rollers 242 in their proper positions while the machine is at rest. The pawl 386 is pivotally mounted on a shaft 388, suitably supported in the printer frames, and is normally held in cooperative relation with the disc 387 by a spring 389. The pawl 386 is connected by a link 390 to one arm of a bell crank 391 loosely mounted on a rod 392 mounted in the printer frames. The other arm of the bell crank 391 carries a roller 393 coacting with a cam 394 secured on a printer drive shaft 395 journaled in the printer framework. The same movement imparted to the main drive shaft 334 is transmitted to the printer drive shaft 395 through a train of gears such as that disclosed in the above-mentioned Shipley patent.

The bell crank 391 will, in turn, through the link 390, rock the aliner 386 counter-clockwise to disengage the latter from the disc 387 during the time the feeding mechanism is automatically operated, as will be described hereinafter.

Each time the hand-operated lever 354 is returned to its normal intermediate position by the slides 358—359 and the spring 360, it will also return the parts associated therewith to their normal positions.

When it is desired to feed the ledger sheet 350 reversely or toward the front of the machine (to the left as viewed in Figs. 7, 9, and 12), the operator moves the hand-operated lever 354 toward the left, as viewed in Fig. 7, thereby rocking the arm 368, the shaft 369, and the arm 370 in a clockwise direction. The arm 370, through the link 371, rocks the arm 372 counter-clockwise.

This will cause the projection 379 (Fig. 8) on the arm 381 to yieldingly hold the stud 378 against such counter-clockwise movement and thereby cause the pawl 375 to rock into engagement with another line-spacing ratchet 410 secured to the shaft 373 in a manner to be described later. As the arm 372 continues its counter-clockwise movement, it will, through the pawl 375, move the ratchet 410, the shaft 373, and the feed rollers 242 secured thereon one step in a counter-clockwise direction, which will feed the ledger sheet 350 reversely or toward the front of the machine.

The manner of mounting the ratchets 385 and 410 and the arms 381 and 382 is as follows. The ratchets 385 and 410 (Fig. 6) are rigidly secured to the tenon of a hub 400 and are spaced apart by a washer 401. The arm 382 is secured to a hub 402, which is journaled on the hub 400. The arm 381 is journaled on the hub 400 and is held in position by a collar 403 on the hub 400. A dowel pin is then driven through the collar 403, the hub 400, and the shaft 373, thus securely fastening the ratchets to said shaft while permitting independent free movements of the arms 381 and 382 relative to the shaft and the ratchets.

It will thus be seen from the above that the operator may manually feed the ledger sheet 350 either forwardly or reversely as many line-spaces as may be desired, by simply manipulating the lever 354 either to the right or to the left (Fig. 7), once for each line-space the ledger sheet is to be fed.

*Automatic means for operating the feeding mechanism*

After the printing of the total amount due on a customer's account, which consists of printing in the "Total bill" column both the gross and the net amounts, it is desirable to have the ledger sheet 350 automatically fed the necessary number of line-spaces to bring the first line of the next customer account space into printing relation with the type wheels. Such automatic feed of the ledger sheet 350 may vary, in the present instance, from one to three line spaces, depending upon the line of the last customer account space from which the ledger sheet is to be fed. The means for accomplishing this result will now be described.

Secured to a hub 404 (Fig. 6) is a ratchet 411. The hub 404 also carries a collar 405, and a pin is driven through the collar 405 and the hub 404 to secure the ratchet to the shaft 373. Each of the tooth spaces on the ratchet 411 is equivalent to three of the tooth spaces on either of the line-spacing ratchets 385 or 410, previously described. The ratchet 411 is adapted to be automatically moved one tooth space in a clockwise direction during an operation of the machine, which will, through the shaft 373 and the feed roller 242, feed the ledger sheet 350 farther into the machine by three line-spaces, the exact number of line-spaces contained in each customer's account space. In the event the ledger sheet 350 has been previously fed one or two line-spaces by the manual means hereinbefore described, the ratchet 411, being secured to the shaft 373, will likewise be moved clockwise the same extent as the manually-operated ratchet 385; consequently, when the ratchet 411 is automatically moved clockwise to feed the ledger sheet 350 to the first printing line of the next customer account space, the clockwise movement thus imparted to the ratchet 411 will be limited to compensate for the clockwise movement previously given to the ratchet 411 by the manual feed means. Such limited clockwise movement of the ratchet 411, however, is sufficient to feed the ledger sheet 350 the necessary number of line-spaces to complete the normal feed, which is automatically given to the ledger sheet to bring the first printing line of the next succeeding customer account space into printing relation with the type wheels. The means for automatically actuating the ratchet 411 to accomplish the above result will now be described.

Loosely mounted on the shaft 373 is an arm 412 carrying a stud 413. Pivotally mounted on the stud 413 and secured together to form a single operating unit are a feeding pawl 414 and an arm 415, the latter carrying a stud 416 normally engaging a notch 417 in an arm 418 pivoted on the hub 404. A spring 419 (Fig. 9) normally holds the lower portion of the arm 418 against the rod 384. When the arm 412 is in its home position, the feed pawl 414 is held out of cooperative relation with the ratchet 411; however, when the ledger sheet 350 is to be fed automatically, the arm 412 is rocked clockwise by means to be described presently, whereupon the arm 418, through the engagement of the stud 416, will yieldingly hold the stud 416 against clockwise movement, thereby causing the pawl 414 to be rocked clockwise into engagement with the ratchet 411. As the arm 412 continues its clockwise movement, it will, through the pawl 414, rotate the ratchet 411 one tooth space or as much thereof as is necessary to bring the first line of a customer's space into printing position. Such rotation of the ratchet 411 will be transmitted through the shaft 373 to the feed rollers 242 to feed the ledger sheet 350 into the machine anywhere from one to three line spaces. The means for rocking the arm 412 clockwise will now be described.

Pivotally mounted on the rod 384 is a lever 420, the upper arm of which is bifurcated to embrace a stud 421 secured to the arm 412, while the other arm of said lever carries a stud 422 normally engaged with a notch 423 in a link 424. The link 424 is pivoted to one arm of a bell crank 425 free on the rod 392. The bell crank 425 carries rollers 426 and 427, which coact with the peripheries of companion plate cams 428 and 429, respectively, secured to the printer drive shaft 395.

During each adding cycle of operation of the machine, the cams 428 and 429 receive one complete clockwise rotation and, through the lever 425 and the link 424, rock the lever 420 first counter-clockwise and then clockwise, thus rocking the arm 412 first clockwise and then counter-clockwise. During the clockwise movement, the arm 412 moves the feeding pawl 414 into engagement with the ratchet 411 to feed the latter as above described. This clockwise movement of the ratchet 411 is transmitted, through the shaft 373, to the feed rollers 242 to feed the ledger sheet 350 automatically in the manner described above.

Secured to the hub 405 and spaced from the ratchet 411 by a washer 406 (Fig. 6) is an overthrow-preventing ratchet 430, which is adapted, during the clockwise movement of the arm 412 and the pawl 414, to be engaged by a pawl 431 (Fig. 9) free on the rod 384 to prevent any overthrow movement of the ratchet 411 by the pawl 414. A stud 432, secured near the lower end of the lever 420, coacts with a tail 433 on the pawl 431 to hold the latter out of cooperative relation with the ratchet 430. The pawl 431 is connected by a spring 434 to the stud 432 on the lever 420. When the lever 420 is rocked counter-clockwise in the manner described above, the stud 432 is moved away from the tail 433, and the spring 434 rocks the pawl 431 counter-clockwise to engage a projection 435 thereon with the ratchet 430 and thus prevent any overthrow movement of the ratchet 411 by the feed pawl 414.

A second aligning pawl 441 (Fig. 6) is provided for maintaining the ledger sheet 350 in proper alinement with the type wheels during printing, at which time the previously-described pawl 386 (Figs. 6 and 7) is rendered ineffective. The pawl 441 is connected by a link 443 to one arm of a bell crank 444 free on the rod 392. The other arms of the lever 444 carries a roller 445 adapted to coact with the periphery of a cam 446 secured to the printer drive shaft 395. In its home position, the cam 446 coacts with the roller 445 to maintain the lever 444 in such a position that it will, through the link 443, hold the pawl 441 against clockwise movement by a spring 442 and thus disengaged from an aligning disc 447 secured to a hub pinned to the feed roller shaft 373.

During the operation of the machine, the pawl 441 begins to move into effective position by engaging the ratchet 447 at about five degrees of the machine cycle of operation and begins to move out of effective position by disengaging from said ratchet at about 220 degrees of such machine cycle of operation. Since the printing in this particular machine takes place at about 205 degrees of the machine cycle, the pawl 441 will engage the ratchet 447 to effectively maintain the ledger sheet 350 in proper alinement during printing.

*Automatic feed control*

Means is provided, under control of the "Total control row" keys 81—86 and rows Nos. 1 and 2 of the transaction keys 78 and 79, respectively, for controlling the automatic operation of the feeding mechanism. This means includes three control discs 457, 458, and 459 (Figs. 6 and 9) carried on a shaft 460 suitably journaled in the printer frames. The peripheries of said discs have notches which are adapted to cooperate with feelers 461, 462, 463, and 464. The feelers 461 and 462 coact with the disc 457, while the feelers 463 and 464 coact with the discs 458 and 459, respectively. The feelers 461 and 462 are secured together and arranged opposite to each other and are pivotally mounted on a stud 465 secured to one arm of a lever 466 freely mounted on a shaft 467 suitably journaled in the printer frames. The feelers 463 and 464 are arranged parallel to the feelers 461 and 462 and are likewise pivotally mounted on the stud 465. The feelers 461, 462, 463, and 464 are pivoted together to form a single operating unit. The other end of the lever 466 is connected by a link 468 to the link 424, previously described. The lever 466 is resiliently connected by a spring 469 to an arm 470 secured to the shaft 467. Immediately after the discs 457, 458, and 459 are adjusted under control of their associated banks of keys, the shaft 467 and the arm 470 are given a counter-clockwise movement by mechanism old and well known in the art (disclosed in Fig. 23 of the above-mentioned Arnold patent).

If the disc 457 is so adjusted as to position the notched portion thereof opposite to or in cooperative relation with the feeler 462, the spring 469 will move the lever 466 in unison with the arm 470 and, through the link 468, disengage the notch in the link 424 from the stud 422. Therefore, when the companion cams 428 and 429 rock the bell crank 425 first clockwise and then back to normal position, the link 424 will move idly back and forth without imparting any automatic feeding movement to the line-spacing ratchet 411 and the feed rollers 242. Should one or more of the feelers 461, 463, or 464 encounter unnotched portions in their associated discs 457, 458, and 459 at the same time the feeler 462 encounters the above-mentioned notched portion of the cam 457, the result will still be the same as that just described.

However, should the feeler 462, in combination with one or more of the feelers 461, 463, and 464, encounter unnotched portions of their respective discs, counter-clockwise movement of the lever 466 will be effectively blocked, and the shaft 467 and the arms 470 will move independently thereof, flexing the spring 469. Consequently, the notch in the link 424 will be retained in engagement with the stud 422, and the initial clockwise movement of the bell crank 425, as explained above, will, by means of the link 424, rock the lever 420 counter-clockwise and, by means of the arm 412 and the feed pawl 414, rock the line-spacing ratchet 411 clockwise, together with the shaft 373 and the feed rollers 242, to automatically feed the paper in the manner heretofore described. Final counter-clockwise movement of the bell crank 425 returns the lever 420, the arm 412, and the feed pawls 414 to their normal positions.

The means by which the control discs 457, 458, and 459 are adjusted under control of their respective control keys will now be described. The "Total control row" of keys 81 to 86, inclusive, controls the adjustment of the control disc 457. Only the "Total bill" key 84 and the "Single line" key 86 in this row are capable of controlling the adjustment of the disc 457 so as to position unnotched portions thereof in cooperative relation with the feelers 461 and 462. All of the other keys in this row control the adjustment of the disc 457 so that a notched portion thereof is positioned in cooperative relation with the feelers 461 and 462. When the "Total bill" key 84 is depressed, the disc 457 will be adjusted so that the only two unnotched portions thereof will be positioned in cooperative relation with the feelers 461 and 462, respectively, while depression of the "Single line" key 86 controls the adjustment of the disc 457 so that only one of the notched portions thereof will be positioned in cooperative relation with the feeler 461. The means for adjusting the disc 457 will now be described.

The "Total control row" of keys 81 to 86 inclusive controls the usual total control plate, together with its associated linkage and train of mechanism (not shown here, but similar to that shown in Fig. 9 of the above-mentioned Arnold patent) for differentially positioning a shaft 476 (Fig. 3) suitably journaled in the machine side frames. The shaft 476 has secured thereon a gear segment 477, which meshes with a gear 478 pinned to a shaft 479 suitably journaled in the printer frames. Also secured to the shaft 479 is another gear 480 (Figs. 6 and 9), which meshes with a gear 481 secured to the notched disc 457. Therefore, when the total control plate is differentially adjusted under control of the "Total control row" keys 81 to 86, the notched disc 457 will, through the above-mentioned train of mechanism, receive a corresponding adjustment.

The means by which the row No. 1 transaction keys 78 control the differential adjustment of the control disc 459 will now be described. Secured on the shaft 143 (Fig. 3) is a gear segment 482, which meshes with an intermediate gear 483 loosely mounted on a stud 484 carried by the base 61. Meshing with the gear 483 is another gear 485 fastened to the shaft 460. The control disc 459, being pinned to the shaft 460, will, through the gearing just described, partake of the differential movement given to the segment 482 under control of the transaction keys 78 in row 1.

The row 2 transaction keys 79 control the differential adjustment of the control disc 458 associated therewith, through a gear segment 486 (Fig. 3) secured to the shaft 138. The shaft 138 has secured thereon a segment (not shown, but similar to the segment 179 associated with the row 1 keys 78), which segment and shaft 138 are differentially positioned in the same manner and by similar means as the corresponding segment 179 for row 1, only under control of the row 2 transaction keys 79. The gear segment 486 meshes with an intermediate gear (not shown, but similar to the gear 483) loosely mounted on the stud 484. The intermediate gear in turn meshes with another gear 487 loosely mounted on the shaft 460. The gear 487 meshes with a gear 488 secured to a shaft 489, which is suitably journaled in the printer frames and has secured thereon another gear 490 (Figs. 6 and 9), which meshes with a gear 491 secured to the side of the control disc 458. The gear 491 and the disc 458 are both loosely mounted on the shaft 460. It will thus be seen from the above that, through the above-mentioned gearing, the control disc 458 will be adjusted according to the differential movement imparted to the shaft 138 by the row 2 transaction keys 79.

Line indicator

An indicator is provided for visually indicating the number of the line of a customer account space on the ledger sheet 350 which is in position to be printed upon. This mechanism includes a gear 501 (Fig. 6) secured to the feed roller shaft 373 and meshing with an intermediate gear 502 free on a stud 503 carried by the printer frame 65. The gear 502, in turn, meshes with gear 504 secured to the side of a flanged roller type of indicator 505. Both the gear 504 and the indicator 505 are freely mounted on a stud 506 secured in the frame 65. The flanged portion of the indicator 505 has engraved on the circumference thereof a series of numerals 1, 2, and 3 in repeated order, each numeral representing the printing position of a different one of the three lines constituting a customer account space on the ledger sheet 350. The numerals are visible through a suitable opening in the machine cabinet. When the feeding rollers are in home position, the number "1," which corresponds to the first printing line of the first customer's account space on the ledger sheet 350, is visible through the above-mentioned opening in the machine cabinet. It is obvious from the foregoing that the indicator 505 will, through the gears 501, 502, and 504, be connected to move in unison with the feed rollers 242, either forwardly or backwardly, thus always indicating the particular printing line of a customer's account space on the ledger sheet 350, which is in position to be printed upon.

As the functions and operations of the machine were fully described at the beginning of this specification, and as the complete operations of all of the mechanisms for performing these functions have been described throughout the specification, it is not thought necessary to give a description of the operation of the machine again.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine adapted to print a plurality of related items on record material, the combination of feeding mechanism for feeding said record material a predetermined distance from a starting position for each plurality of related items, said distance including a plurality of line-space positions; a plurality of related ratchets for actuating said feeding means, one of said ratchets actuating said feeding means to line-space the record material in one direction, another one of said ratchets actuating the feeding means to line-space the record material in the opposite direction, and a third ratchet connected to the other two ratchets and movable therewith as the other two ratchets are operated to line-space the record material, said third ratchet being effective to provide a maximum operation of the feeding mechanism to feed the record material said predetermined distance in one of said directions if no line-spacing has occurred and if line-spacing has occurred, being effective to provide an operation of the feeding mechanism to feed the record material from the position to which it was last line-spaced, a distance necessary to complete the feeding of the record material said predetermined distance; manually operable means to selectively operate said one or said other ratchet to line-space the record backward and forward to the various line-space positions in any order during the printing of the related items; manipulative means operable when the last item is to be printed; and means controlled by the manipulative means to engage the third ratchet in any of its moved positions and operate this ratchet to complete the feeding of the record material said predetermined distance.

2. In a machine of the class described, adapted to print data concerned with plural-item transactions upon record material, the combination of a shaft; a plurality of feed rollers secured to said shaft and adapted to feed the record material a predetermined distance which includes a plurality of line-space positions; a plurality of ratchets also secured to said shaft, one of said ratchets operable to move said shaft and feed rollers in one direction to line-space the record material in said one direction, and another of said ratchets operable to move said shaft and feed rollers in a reverse direction to line-space the record material in a reverse direction; a manually movable device which when moved in one direction operates one of said ratchets and when moved in another direction operates another ratchet whereby the record material may be fed at random backward and forward to desired ones of said line-space positions to enable the various data of the plural-item transaction to be printed in proper line-space positions; a third ratchet connected to said shaft and movable back and forth as the feeding means is line-spaced, said third ratchet being operable to move the shaft and the feeding means to feed the record material an extent necessary to complete said predetermined distance; and means operable at the end of the printing of data of a plural-item transaction for engaging the third ratchet in any of its moved positions and thereafter operating the ratchet to move the shaft and the feed rollers to feed the record material in one of said directions from the line-space position to which it was last moved by the manually operated means, an extent sufficient to complete the feeding of the record material said predetermined distance.

3. In a machine for printing plural-item transactions, the combination of feeding means for advancing the record material a uniform distance from a starting position for each transaction, said uniform distance embracing a plurality of printing lines; a plurality of actuating means for the feeding means to feed the record material different directions and different extents; a manually operable means; means intermediate certain of said actuating means and said manually operable means and controlled by the manually operable means for operating one of said certain actuating means in one direction a definite distance and for operating another of said certain actuating means in the opposite direction and a definite distance, whereby the record material may be fed back and forth to bring various printing lines into printing position in any order and as many times as desired during the printing of the items of a transaction; a plurality of manually operable control means for controlling item printing operations, certain of which control means are operated to control any operation in which the last item is to be printed; and means controlled by said certain control means for operating a further one of said actuating means to cause an operation of the feeding means in an operation in which the last item is to be printed, which operation of the feeding means will vary in extent to feed the material from the printing line which was last fed into printing position a distance required to complete the uniform advance of the record material for each transaction.

4. In a machine of the class described, the combination of means to print a plurality of related items on record material; feeding means for feeding the record material past the printing means a predetermined distance for each plurality of related items, said distance embracing a plurality of printing lines; actuating means for the feeding means, said actuating means including a plurality of ratchets and a plurality of pawls normally disengaged therefrom; a manually operable member; a device carrying a certain plurality of said pawls and operated in one or another direction by said manually operable member; means cooperating with said certain plurality of pawls for causing one of said ratchets to be engaged by and actuated by one of said certain pawls to operate the feeding means and line-space the record material in one direction when the device is operated in one direction by the manually operable member and for causing another of said ratchets to be engaged by and actuated by another of said certain pawls to operate the feeding means and line-space the record material in the reverse direction when the device is operated in the other direction by the manually operable member, whereby the record material may be line-spaced backwardly and forwardly at will to present any desired ones of said printing lines to said printing mechanism; a plurality of manipulative control means for controlling the printing of the various related items, one or more of which control means is operated when the last of the plurality of related items is to be printed; a second device for carrying another one of said pawls; means operated under control of the manipulative control means for operating said second device when the last of the plurality of items is to be printed; and means cooperating with the pawl carried by the second device for causing still another of said plurality of ratchets to be engaged by and actuated by said other one of the pawls when said second device is operated, whereby the feeding means is operated to feed the record material from the printing line to which it was last line-spaced, an extent sufficient to complete the feeding of the record material said predetermined distance.

5. In a machine of the class described, the combination of means to print on record material; feeding means to feed the record material in different directions, including a plurality of ratchet wheels and a plurality of feeding pawls normally disengaged therefrom; a device carrying said pawls and movable in either of two directions from a normal neutral position; a manually operable member connected to the device and operable to move the device in either of said directions; and means cooperable with said pawls for causing engagement of one of the pawls with one of the ratchet wheels when the manually operable member moves the device in one direction and for causing engagement of another of the pawls with another of the ratchet wheels when said member moves the device in another direction.

6. In a machine of the class described, the combination of means to print on record material; feeding means to feed the record material in different directions, including a plurality of ratchet wheels and a plurality of feeding pawls normally disengaged therefrom; a device carrying said pawls and movable in either of two directions from a normal position; means cooperable with the pawls and effective, upon initial movement of the device in either direction from its normal position, to cause one or the other of the pawls to engage its related ratchet so that further operation of the device will cause the engaged pawl to operate its ratchet and feed the record material in one of said different directions; a manually operable member connected to the device and operable to move the device in either of said two directions to cause the record material to be fed in either of said two directions; and common means for restoring the member and the device to their normal positions after each feeding movement of the record material in either of its directions of movement.

7. In a machine of the class described adapted to print on record material, the combination of feeding means for moving said record material in either of two directions to various line space positions for receiving impressions thereon; a pair of oppositely disposed ratchets connected to said feeding means; an arm movable in either of two directions from a normal position; a member pivoted on said arm and having two pawls, one cooperating with each of said ratchets; yieldable means engageable with said member to hold the pawls out of engagement with their respective ratchets when the arm is in its normal position, and operable to rock the member about its pivot to engage one or the other of the pawls with its associated ratchet upon initial movement of the arm from its normal position in either of said directions; and means to rock the arm in either of said two directions to cause one or the other of the pawls first to be engaged with its related ratchet and thereafter to operate that ratchet to feed the record material from one to another line space position, whereby the record material may be line spaced in either of said two directions.

PASCAL SPURLINO.
MAYO A. GOODBAR.
MARVIN D. FROST.